(12) United States Patent
Fu et al.

(10) Patent No.: US 11,609,879 B2
(45) Date of Patent: Mar. 21, 2023

(54) TECHNIQUES FOR CONFIGURING PARALLEL PROCESSORS FOR DIFFERENT APPLICATION DOMAINS

(71) Applicant: NVIDIA CORPORATION, Santa Clara, CA (US)

(72) Inventors: Yaosheng Fu, San Jose, CA (US); Evgeny Bolotin, Kenmore, WA (US); Niladrish Chatterjee, Kirkland, WA (US); Stephen William Keckler, Austin, TX (US); David Nellans, Round Rock, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/365,315

(22) Filed: Jul. 1, 2021

(65) Prior Publication Data
US 2022/0276984 A1    Sep. 1, 2022

Related U.S. Application Data

(60) Provisional application No. 63/154,286, filed on Feb. 26, 2021.

(51) Int. Cl.
| *G06F 15/78* | (2006.01) |
| *G06F 12/0811* | (2016.01) |
| *G06F 12/12* | (2016.01) |
| *G06F 13/40* | (2006.01) |

(52) U.S. Cl.
CPC ...... *G06F 15/7839* (2013.01); *G06F 12/0811* (2013.01); *G06F 12/12* (2013.01); *G06F 13/4022* (2013.01); *G06F 2212/1041* (2013.01)

(58) Field of Classification Search
CPC .... G06F 15/7839; G06F 12/0811; G06F 2/12; G06F 13/4022
USPC .......................................................... 712/17
See application file for complete search history.

(56) References Cited

U.S. PATENT DOCUMENTS

| 10,963,411 B1* | 3/2021 | Voogel ................ G06F 13/4022 |
| 2009/0046533 A1* | 2/2009 | Jo ........................ G06F 13/1694 |
| | | 365/230.03 |
| 2011/0173377 A1* | 7/2011 | Bonica ...................... G06F 21/79 |
| | | 711/E12.001 |

(Continued)

OTHER PUBLICATIONS

ML Commons, "MLPerf Training Results v0.6", Retrieved from https://mlcommons.org/en/training-normal-06/, on Sep. 8, 2021, Jun. 10, 2019, 3 pages.

(Continued)

*Primary Examiner* — Chun Kuan Lee
(74) *Attorney, Agent, or Firm* — Artegis Law Group, LLP

(57) ABSTRACT

In various embodiments, a parallel processor includes a parallel processor module implemented within a first die and a memory system module implemented within a second die. The memory system module is coupled to the parallel processor module via an on-package link. The parallel processor module includes multiple processor cores and multiple cache memories. The memory system module includes a memory controller for accessing a DRAM. Advantageously, the performance of the parallel processor module can be effectively tailored for memory bandwidth demands that typify one or more application domains via the memory system module.

22 Claims, 7 Drawing Sheets

(56) References Cited

U.S. PATENT DOCUMENTS

| | | | | |
|---|---|---|---|---|
| 2012/0066445 | A1* | 3/2012 | Searles | G06F 13/4072 |
| | | | | 365/194 |
| 2019/0034097 | A1* | 1/2019 | Chang | G06F 15/7821 |
| 2019/0057045 | A1* | 2/2019 | Jiang | G06F 12/0811 |
| 2020/0050251 | A1* | 2/2020 | Naik | G06F 9/3869 |

OTHER PUBLICATIONS

Moore, Gordon E., "Cramming More Components onto Integrated Circuits", Electronics, vol. 38, No. 8, Apr. 19, 1965, 6 pages.

Naffziger et al., "AMD Chiplet Architecture for High-Performance Server and Desktop Products", International Solid-State Circuits Conference (ISSCC), Session 2, 2.2, Feb. 17, 2020, pp. 44-45.

NASA, "FUN3D", Retrieved from https://fun3d.larc.nasa.gov, on Sep. 3, 2021, 2 pages.

Nvidia, "Nvidia Kepler GK110 Architecture", Retrieved from https://www.nvidia.com/content/PDF/kepler/NVIDIAKepler-GK110-Architecture-Whitepaper.pdf, on Sep. 3, 2021, 2012, 24 pages.

Nvidia, "Nvidia NVLink", Retrieved from https://www.nvidia.com/en-us/data-center/nvlink, on Sep. 3, 2021, 2016, 7 pages.

Nvidia, "Nvidia Tesla P100 Architecture", Retrieved from https://images.nvidia.com/content/pdf/tesla/whitepaper/pascalarchitecture-whitepaper.pdff, on Sep. 3, 2021, vol. 1, 2016, pp. 1-45.

Nvidia, "Nvidia Tesla V100 Architecture", Retrieved from Available: http://images.nvidia.com/content/volta-architecture/pdf/voltaarchitecture-whitepaper.pdf, on Sep. 3, 2021, vol. 1, Aug. 2017, 58 pages.

Nvidia, "Nvidia Turing GPU Architecture", Retrieved from https://www.nvidia.com/content/dam/en-zz/Solutions/designvisualization/technologies/turing-architecture/NVIDIA-Turing-Architecture-Whitepaper.pdf, on Sep. 3, 2021, 2019, 86 pages.

Nvidia, "Nvidia A100 Tensor Core GPU Architecture", Retrieved from https://www.nvidia.com/content/dam/en-zz/Solutions/Data-Center/nvidia-ampere-architecture-whitepaper.pdf, on Sep. 3, 2021, 2020, 82 pages.

"Open Specification for a Liquid Cooled Server Rack—Progress Update", Retrieved from https://datacenters.lbl.gov/sites/default/files/OpenSpecification.pdf, on Sep. 3, 2021, Jun. 20, 2018, pp. 1-14.

Pal et al., "Optimizing Multi-GPU Parallelization Strategies for Deep Learning Training", IEEE Micro, vol. 39, No. 5, DOI 10.1109/MM.2019.2935967, Aug. 19, 2019, pp. 91-101.

Pano et al., "3D NoCs with Active Interposer for Multi-Die Systems", International Symposium on Networks-on-Chip (NOCS), DOI: 10.1145/3313231.3352380, 2019, pp. 1-8.

Reddi et al., "MLPerf Inference Benchmark", International Symposium on Computer Architecture (ISCA), DOI 10.1109/ISCA45697.2020.00045, 2020, pp. 446-459.

Ren et al., "HMG:Extending Cache Coherence Protocols Across Modern Hierarchical Multi-GPU Systems", International Symposium on High-Performance Computer Architecture (HPCA), DOI 10.1109/HPCA47549.2020.00054, 2020, pp. 582-595.

Ronneberger et al., "U-Net: Convolutional Networks for Biomedical Image Segmentation", arXiv: 1505.04597, 2015, 8 pages.

Sallab et al., "Deep Reinforcement Learning framework for Autonomous Driving", Electronic Imaging, https://doi.org/10.2352/ISSN.2470-1173.2017.19.AVM-023, 2017, pp. 70-76.

Shao et al., "Simba: Scaling Deep-Learning Inference with Multi-Chip-Module-Based Architecture", International Symposium on Microarchitecture (MICRO), https://doi.org/10.1145/3352460.3358302, Oct. 12-16, 2019, 14 pages.

Sun et al., "Deep Learning Face Representation by Joint Identification-Verification", International Conference on Neural Information Processing Systems, arXiv:1406.4773, 2014, pp. 1-9.

Turner et al., "Ground-Referenced Signaling for Intra-Chip and Short-Reach Chip-to-Chip Interconnects", IEEE Custom Integrated Circuits Conference (CICC), 2018, 8 pages.

Vashishtha et al., "Robust 7-nm SRAM Design on a Predictive PDK", International Symposium on Circuits and Systems (ISCAS), 2017, 4 pages.

Villa et al., "Need for Speed: Experiences Building a Trustworthy System-Level GPU Simulator", International Symposium on High-Performance Computer Architecture (HPCA), DOI 10.1109/HPCA51647.2021.00077, 2021, pp. 868-880.

Vivet et al., "A 220GOPS 96-Core Processor with 6 Chiplets 3D-Stacked on an Active Interposer Offering 0.6ns/mm Latency, 3Tb/s/mm2 Inter-Chiplet Interconnects and 156mW/mm2 @ 82%-Peak-Efficiency DC-DC Converters", International Solid-State Circuits Conference (ISSCC), Session 2, 2.3, Feb. 17, 2020, pp. 45-47.

Young et al., "Combining HW/SW Mechanisms to Improve NUMA Performance of Multi-GPU Systems", International Symposium on Microarchitecture (MICRO), DOI 10.1109/MICRO.2018.00035, 2018, pp. 339-351.

"Gromacs", Retrieved from http://www.gromacs.org/, on Sep. 3, 2021, 2020, 1 page.

"Relion", Retrieved from https://github.com/3dem/relion, on Sep. 3, 2021, 2020, 5 pages.

"SPECFEM3D Cartesian", User Manual, Retrieved from https://geodynamics.org/cig/software/specfem3d, on Sep. 3, 2021, 2020, 118 pages.

"The Amber18 Benchmarks", Retrieved from https://hpc.nih.gov/apps/amber/amber18B.html on Sep. 8, 2021, 2018, 5 pages.

"Amd Instinct™ MI100 Accelerator", Retrieved from https://www.amd.com/system/files/documents/instinctmi100-brochure.pdf, on Sep. 3, 2021,2020, 2 pages.

Amodei et al., "Deep Speech 2 : End-to-End Speech Recognition in English and Mandarin", ProInternational Conference on Machine Learning (ICML), 2016, 10 pages.

Arunkumar et al., "MCM-GPU: Multi-Chip-Module GPUs for Continued Performance Scalability", International Symposium on Computer Architecture (ISCA), https://doi.org/http://dx.doi.org/10.1145/3079856.3080231, Jun. 24-28, 2017, 13 pages.

Arunkumar et al., "Understanding the Future of Energy Efficiency in Multi-Module GPUs", International Symposium on High-Performance Computer Architecture (HPCA), DOI 10.1109/HPCA.2019.00063, 2019, pp. 519-532.

Berry et al., "IBM z15: A 12-Core 5.2GHz Microprocessor", International Solid-State Circuits Conference (ISSCC), Session 2, 2.7, Feb. 17, 2020, 3 pages.

Bolotin et al., "Designing Efficient Heterogeneous Memory Architectures", IEEE Micro, vol. 35, No. 4, Jul./Aug. 2015, pp. 60-68.

Burd et al., "Zeppelin": An SoC for Multichip Architectures, IEEE Journal of Solid-State Circuits, vol. 54, No. 1, DOI 10.1109/JSSC.2018.2873584, Jan. 2019, pp. 1-11.

Chang et al., "A 5nm 135-Mb SRAM in EUV and High-Mobility-Channel FinFET Technology with Metal Coupling and Charge-Sharing Write-Assist Circuitry Schemes for High-Density and Low-VMIN Applications", International Solid-State Circuits Conference (ISSCC), vol. 56, No. 1, Jan. 2021, pp. 179-187.

Chen et al., "System on Integrated Chips (SoIC™) for 3D Heterogeneous Integration", Electronic Components and Technology Conference (ECTC), DOI 10.1109/ECTC.2019.00095, 2019, pp. 594-599.

Chen et al., "DaDianNao: A Machine-Learning Supercomputer", International Symposium on Microarchitecture (MICRO), DOI 10.1109/MICRO.2014.58, 2014, pp. 609-622.

Sverdlik, Yevgeniy, "Google Brings Liquid Cooling to Data Centers to Cool Latest AI Chips", Retrieved from https://www.datacenterknowledge.com/google-alphabet/googlebrings-liquid-cooling-data-centers-cool-latest-ai-chips, on Sep. 8, 2021, May 8, 2018, 5 pages.

Dehlaghi et al., "Ultra-Short-Reach Interconnects for Die-to-Die Links: Global Bandwidth Demands in Microcosm", IEEE Solid-State Circuits Magazine, vol. 11, No. 2, DOI 10.1109/MSSC.2019.2910619, 2019, Jun. 24, 2019, pp. 42-53.

Devlin et al., "BERT: Pre-training of Deep Bidirectional Transformers for Language Understanding", arXiv: 1810.04805,2018, 16 pages.

"Graphcore IPU", IPU Processors, Retrieved from https://www.graphcore.ai/products/ipu, on Sep. 3, 2021, 2020, 7 pages.

(56) References Cited

OTHER PUBLICATIONS

Greenhill et al., "A 14nm 1GHz FPGA with 2.5D Transceiver Integration", International Solid-State Circuits Conference (ISSCC), Digital Processors, Session 3, 3.3, Feb. 6, 2017, pp. 53-55.
Gu et al., "Deep Reinforcement Learning for Robotic Manipulation with Asynchronous Off-Policy Updates", International Conference on Robotics and Automation (ICRA), May 29-Jun. 3, 2017, pp. 3389-3396.
Guo et al., "A 23.6-Mb/mm2 SRAM in 10-nm FinFET Technology With Pulsed-pMOS TVC and Stepped-WL for Low-Voltage Applications", International Solid-State Circuits Conference (ISSCC), Session 11, Feb. 13, 2018, pp. 195-197.
Gwennap, Linley, "Groq Rocks Neural Networks", Microprocessor Report by the Linley Group, Jan. 6, 2020, pp. 1-5.
He et al., "Deep Residual Learning for Image Recognition", Conference on Computer Vision and Pattern Recognition (CVPR), DOI 10.1109/CVPR.2016 90, Jun. 2016, pp. 770-778.
He et al., "Neural Collaborative Filtering", International World Wide Web Conference (WWW), arXiv: 1708.05031, http://dx.doi.org/10.1145/3038912.3052569, Apr. 3-7, 2017, 10 pages.
Hou et al., "Wafer-Level Integration of an Advanced Logic-Memory System Through the Second-Generation CoWoS Technology", IEEE Transactions on Electron Devices, vol. 64, No. 10, 10.1109/TED.2017.2737644, Oct. 2017, pp. 4071-4077.
Hu et al., "3D Multi-chip Integration with System on Integrated Chips (SoIC™)," Symposium on VLSI Technology, 2019, 2 pages.
Hubara et al., "Binarized Neural Networks", Advances in Neural Information Processing Systems, vol. 29, 2016, pp. 1-9.
Ingerly et al., "Foveros: 3D Integration and the use of Face-to-Face Chip Stacking for Logic Devices", IEEE International Electron Devices Meeting (IEDM), 2019, pp. 466-469.
Bohr, Mark, "14 nm Technology Announcement", https://www.intel.com/content/dam/www/public/us/en/documents/presentation/advancing-moores-law-in-2014-presentation.pdf, 2015, 68 pages.
Jia et al., "Dissecting the Graphcore IPU Architecture via Microbenchmarking", Citadel, arXiv:1912.03413, Dec. 7, 2019, 91 pages.
Jiao et al., "A 12nm Programmable Convolution-Efficient Neural-Processing-Unit Chip Achieving 825TOPS", International Solid-State Circuits Conference (ISSCC), Session 7, 7.2, Feb. 18, 2020, pp. 135-139.
Jouppi et al., "A Domain-Specific Supercomputer for Training Deep Neural Networks", Communications of the ACM, vol. 63, No. 7, DOI:10.1145/3360307, Jul. 2020, pp. 67-78.
Jouppi et al., "In-Datacenter Performance Analysis of a Tensor Processing Unit", International Symposium on Computer Architecture (ISCA), https://doi.org/10.1145/3079856.3080246, Jun. 24-28, 2017, pp. 1-12.
Kannan et al., "Enabling Interposer-based Disintegration of Multicore Processors", International Symposium on Networks-on-Chip (NOCS), DOI: http://dx.doi.org/10.1145/2830772.2830808, Dec. 5-9, 2015, pp. 546-558.
Kaplan et al., "Scaling Laws for Neural Language Models", arXiv:2001.08361, 2020, 30 pages.
Keckler et al., "GPUs and the Future of Parallel Computing", IEEE Micro, vol. 31, No. 5, Sep./Oct. 2011, pp. 7-17.
Khairy et al., "Accel-Sim: An Extensible Simulation Framework for Validated GPU Modeling", International Symposium on Computer Architecture (ISCA), DOI 10.1109/ISCA45697.2020.00047, 2020, pp. 473-486.
Klenk et al., "An In-Network Architecture for Accelerating Shared-Memory Multiprocessor Collectives", International Symposium on Computer Architecture (ISCA), DOI 10.1109/ISCA45697.2020.00085, 2020, pp. 996-1009.
Zhang et al., "Ternary weight networks", 30th Conference on Neural Information Processing Systems NIPS, arXiv: 1605.04711, 2016, pp. 1-5.
Li et al., "Accelerating Distributed Reinforcement Learning with In-Switch Computing", International Symposium on Computer Architecture (ISCA), https://doi.org/10.1145/3307650.3322259, Jun. 22-26, 2019, 13 pages.
Lie, S., "Wafer Scale Deep Learning", Cerebras Systems, HotChips-31, 2019, 31 pages.
Lin et al., "A 7nm 4GHz Armcore-based CoWoS Chiplet Design for High Performance Computing", Symposium on VLSI Circuits, 2019, 2 pages.
Github, "Laghos", Retrieved from https://github.com/CEED/Laghos, on Sep. 8, 2021, 11 pages.
"The CORAL Benchmarks", Advanced Simulationand Computing, Retrieved from https://asc.llnl.gov/coral-benchmarks, on Sep. 3, 2021, 2014, 7 pages.
"The CORAL-2 Benchmarks", Retrieved from https://asc.llnl.gov/coral-2-benchmarks, on Sep. 3, 2021, 2017, 10 pages.
Loh et al., "Interconnect-Memory Challenges for Multi-Chip, Silicon Interposer Systems", International Symposium on Memory Systems, DOI: 10.1145/1235, Oct. 6-8, 2015, 8 pages.
Mattson et al., "MLPerf Training Benchmark", Machine Learning and Systems (MLSys), arXiv:1910.01500, 2020, 14 pages.
Micikevicius et al., "Mixed Precision Training", International Conference on Learning Representations (ICLR), arXiv:1710.03740, 2018, pp. 1-12.
Milic et al., "Beyond the Socket: NUMA-aware GPUs", International Symposium on Microarchitecture (MICRO), https://doi.org/10.1145/3123939.3124534, Oct. 14-18, 2017, 13 pages.
ML Commons, "MLPerf Inference Results v0.5," Retrieved from https://mlperf.org/inference-datacenter-05/, on Sep. 8, 2021, Nov. 6, 2019, 4 pages.

* cited by examiner

TECHNIQUES FOR CONFIGURING PARALLEL PROCESSORS FOR DIFFERENT APPLICATION DOMAINS

CROSS-REFERENCE TO RELATED APPLICATIONS

This application claims priority benefit of the U.S. Provisional Patent application titled, "COMPOSABLE ON-PACKAGE ARCHITECTURE FOR GRAPHICS PROCESSING UNIT DOMAIN SPECIALIZATION," filed on Feb. 26, 2021 and having Ser. No. 63/154,286. The subject matter of this related application is hereby incorporated herein by reference.

BACKGROUND

Field of the Various Embodiments

The various embodiments relate generally to computer architecture and parallel processor implementation and, more specifically, to techniques for configuring parallel processors for different application domains.

Description of the Related Art

As a general matter, parallel processors achieve very high levels of processing performance by executing large numbers of threads in parallel across many different processing cores. Accordingly, parallel processors are oftentimes implemented across many different application domains where the relevant workloads can be broken into blocks of data that can be processed in parallel to increase processing throughput and overall processing efficiency. To satisfy differing computing requirements across multiple target application domains, many parallel processors are designed as single monolithic dies having a "converged" architecture. In a converged architecture, the processing cores typically include specialized hardware for each target application domain in order to increases compute throughput when processing associated workloads. For instance, the processing cores included in a typical converged architecture include, without limitation, low precision matrix arithmetic units and high precision arithmetic units that can increase compute throughput for deep learning workloads and high performance computing workloads, respectively.

One drawback of using a converged architecture for a parallel processor is that the memory bandwidth allocation for off-die dynamic random access memory (DRAM) is usually a compromise between the relatively low memory bandwidth demands of some workloads and the relatively high memory bandwidth demands of some other workloads. Consequently, the allocated memory bandwidth is oftentimes underutilized and, therefore, wasted for workloads having relatively low memory bandwidth demands, such as many high performance computing workloads. On the flipside, the allocated memory bandwidth can become a performance bottleneck for workloads having relatively high memory bandwidth demands, such as many deep learning workloads, thereby limiting the performance gains attributable to any specialized hardware implemented for deep learning or other similar applications.

To address relatively high memory bandwidth demands in a converged architecture, the amount of on-chip cache memory could be increased to mitigate the relatively long access delays associated with the off-die DRAM. However, because converged architecture parallel processors are typically implemented on dies that are at or close to the maximum manufacturable die size (e.g., approximately 800 mm$^2$), increasing the amount of on-die cache memory could require removing other circuitry from the parallel processor or limiting other circuitry within the parallel processor. Removing or reducing circuitry usually, if not always, decreases overall processing performance, which is undesirable.

As the foregoing illustrates, what is needed in the art are more effective ways to configure a parallel processor for disparate memory bandwidth demands.

SUMMARY

One embodiment of the present invention sets forth a parallel processor. The parallel processor includes a parallel processor module implemented within a first die, where the parallel processor module includes a plurality of processor cores and a plurality of cache memories; and a memory system module implemented within a second die and coupled to the parallel processor module via an on-package link, wherein the memory system module includes a first memory controller for accessing a first dynamic random access memory (DRAM).

At least one technical advantage of the disclosed techniques relative to the prior art is that, with the disclosed techniques, the performance of a parallel processor module implemented on a single die can be effectively tailored for different memory bandwidth demands that typify different application domains. In particular, for workloads having relatively high memory bandwidth demands, a parallel processor can be configured with a processor module that can access additional cache memory via one or more on-package, ultra-high bandwidth links, which can reduce the DRAM access delays and memory bandwidth bottlenecks normally experienced with converged architecture parallel processors. Further, because the additional cache memory is implemented on a separate die, there is no need to remove circuitry from the processor module or limit circuitry within the processor module to make room for the additional cache memory. These technical advantages provide one or more technological improvements over prior art approaches.

BRIEF DESCRIPTION OF THE DRAWINGS

So that the manner in which the above-recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Exemplary System Overview

Figure 1:
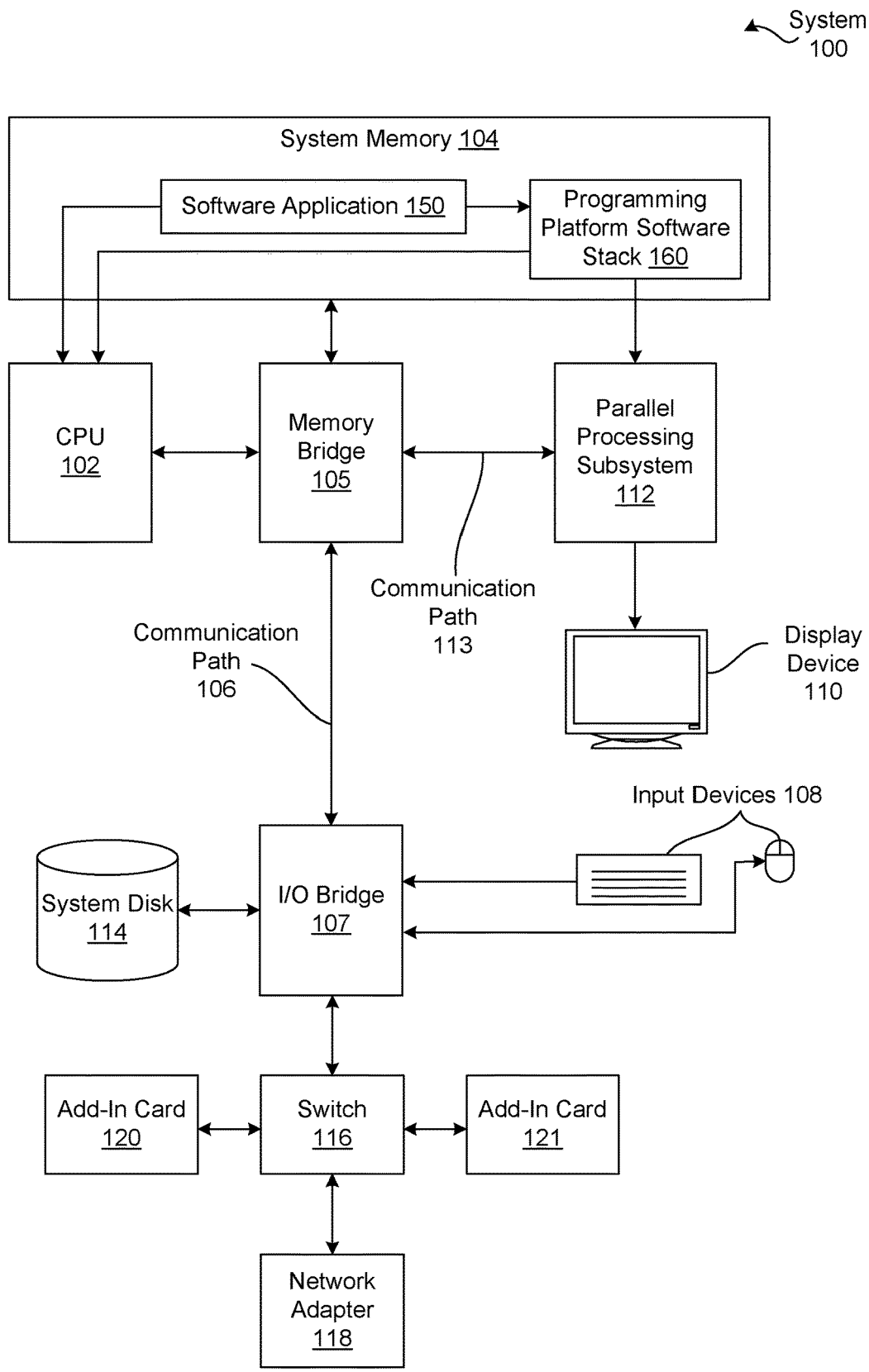
FIG. 1 is a block diagram illustrating a system configured to implement one or more aspects of the various embodiments.

FIG. 1 is a block diagram illustrating a system 100 configured to implement one or more aspects of the various embodiments. As shown, the system 100 includes, without limitation, a CPU 102 and a system memory 104 coupled to a parallel processing subsystem 112 via a memory bridge 105 and a communication path 113. In some embodiments, at least a portion of the system memory 104 is host memory associated with the CPU 102. The memory bridge 105 is further coupled to an input/output (I/O) bridge 107 via a communication path 106, and the I/O bridge 107 is, in turn, coupled to a switch 116. For explanatory purposes only, multiple instances of like objects are denoted herein with reference numbers identifying the object and parenthetical alphanumeric character(s) identifying the instance where needed.

In operation, the I/O bridge 107 is configured to receive user input information from input devices 108, such as a keyboard or a mouse, and forward the input information to the CPU 102 for processing via the communication path 106 and the memory bridge 105. The switch 116 is configured to provide connections between the I/O bridge 107 and other components of the system 100, such as a network adapter 118 and add-in cards 120 and 121.

As also shown, the I/O bridge 107 is coupled to a system disk 114 that can be configured to store content, applications, and data for use by the CPU 102 and the parallel processing subsystem 112. As a general matter, the system disk 114 provides non-volatile storage for applications and data and can include fixed or removable hard disk drives, flash memory devices, compact disc read-only memory, digital versatile disc read-only memory, Blu-ray, high definition digital versatile disc, or other magnetic, optical, or solid-state storage devices. Finally, although not explicitly shown, other components, such as a universal serial bus or other port connections, compact disc drives, digital versatile disc drives, film recording devices, and the like, can be connected to the I/O bridge 107 as well.

In various embodiments, the memory bridge 105 can be a Northbridge chip, and the I/O bridge 107 can be a Southbridge chip. In addition, the communication paths 106 and 113, as well as other communication paths within the system 100, can be implemented using any technically suitable protocols, including, without limitation, Peripheral Component Interconnect Express, Accelerated Graphics Port, HyperTransport, or any other bus or point-to-point communication protocol known in the art.

In some embodiments, the parallel processing subsystem 112 includes, without limitation, one or more parallel processors. In some embodiments, each parallel processor is a graphics processing unit (GPU) that includes, without limitation, one or more streaming multiprocessors (SMs). Each SM includes, without limitation, multiple execution units that are also referred to herein as "processor cores". For explanatory purposes, each SM is also referred to herein as a "multi-threaded processor core." In some embodiments, the parallel processors can be identical or different, and each parallel processor can be associated with dedicated parallel processing (PP) memory or no dedicated PP memory. In some embodiments, the PP memory associated with a given parallel processor includes, without limitation, one or more types of dynamic random access memory (DRAM). In some embodiments, the PP memory associated with a given GPU is also referred to as the "device memory" associated with the GPU. In the same or other embodiments, each kernel that is launched on a given GPU resides in the device memory of the GPU.

In some embodiments, the parallel processing subsystem 112 incorporates circuitry optimized for general-purpose processing. Such circuitry can be incorporated across one or more GPUs that can be configured to perform general-purpose processing operations. In the same or other embodiments, the parallel processing subsystem 112 further incorporates circuitry optimized for graphics processing. Such circuitry can be incorporated across one or more GPUs that can be configured to perform graphics processing operations. In the same or other embodiments, any number of GPUs can output data to any number of display devices 110. In some embodiments, zero or more of the GPUs can be configured to perform general-purpose processing operations but not graphics processing operations, zero or more of the GPUs can be configured to perform graphics processing operations but not general-purpose processing operations, and zero or more of the GPUs can be configured to perform general-purpose processing operations and/or graphics processing operations. In some embodiments, software applications executing under the control of the CPU 102 can launch kernels on one or more GPUs. The term "kernel," as used herein, refers to a set of instructions (e.g., a program, a function, etc.) that can execute on a parallel processor.

In some embodiments, the parallel processing subsystem 112 can be integrated with one or more other elements of FIG. 1 to form a single system. For example, the parallel processing subsystem 112 can be integrated with the CPU 102 and other connection circuitry on a single chip to form a system on a chip. In the same or other embodiments, any number of CPUs 102 and any number of parallel processing subsystems 112 can be distributed across any number of shared geographic locations and/or any number of different geographic locations and/or implemented in one or more cloud computing environments (i.e., encapsulated shared resources, software, data, etc.) in any combination.

The system memory 104 can include, without limitation, any number and/or types of system software (e.g., operating systems, device drivers, library programs, utility programs, etc.), any number and/or types of software applications, or any combination thereof. The system software and the software applications included in the system memory 104 can be organized in any technically feasible fashion.

As shown, in some embodiments, the system memory 104 includes, without limitation, a programming platform software stack 160 and a software application 150. The programming platform software stack 160 is associated with a programming platform for leveraging hardware in the parallel processing subsystem 112 to accelerate computational tasks. In some embodiments, the programming platform is accessible to software developers through, without limitation, libraries, compiler directives, and/or extensions to programming languages. In the same or other embodiments, the programming platform can be, but is not limited to, Compute Unified Device Architecture (CUDA) (CUDA® is developed by NVIDIA Corporation of Santa Clara, Calif.), Radeon Open Compute Platform (ROCm), OpenCL (OpenCL™ is developed by Khronos group), SYCL, or Intel One API.

In some embodiments, the programming platform software stack 160 provides an execution environment for the software application 150 and zero or more other software applications (not shown). In the same or other embodiments, the software application 150 can include, without limitation, any computer software capable of being launched on the programming platform software stack 160. In some embodiments, the software application 150 can be, but is not limited to, an artificial intelligence application or workload, a machine learning application or workload, a deep learning application or workload, a high-performance computing application or workload, a virtual desktop infrastructure, or a data center workload.

In some embodiments, the software application 150 and the programming platform software stack 160 execute under the control of the CPU 102. In the same or other embodiments, the software application 150 can access one or more GPUs included in the parallel processing subsystem 112 via the programming platform software stack 160.

Note that the techniques described herein are illustrative rather than restrictive and may be altered without departing from the broader spirit and scope of the invention. Many modifications and variations on the functionality provided by the software application 150, the programming platform software stack 160, the CPU 102, the parallel processing subsystem 112, the GPU(s), the SM(s), the compute engine (s), and the resource manager will be apparent to those of ordinary skill in the art without departing from the scope and spirit of the described embodiments. For instance, in some embodiments, the CPU 102 can be replaced with any type of processor that is capable of launching kernels on the parallel processor(s).

It will be appreciated that the system shown herein is illustrative and that variations and modifications are possible. The connection topology, including the number and arrangement of bridges, the number of the CPUs 102, and the number of the parallel processing subsystems 112, can be modified as desired. For example, in some embodiments, the system memory 104 can be connected to the CPU 102 directly rather than through the memory bridge 105, and other devices can communicate with the system memory 104 via the memory bridge 105 and the CPU 102. In some other alternative topologies, the parallel processing subsystem 112 can be connected to the I/O bridge 107 or directly to the CPU 102, rather than to the memory bridge 105. In still other embodiments, the I/O bridge 107 and the memory bridge 105 can be integrated into a single chip instead of existing as one or more discrete devices. Lastly, in certain embodiments, one or more components shown in FIG. 1 may not be present. For example, the switch 116 could be eliminated, and the network adapter 118 and the add-in cards 120, 121 would connect directly to the I/O bridge 107.

As described previously herein, to satisfy differing computing requirements across multiple target application domains, many conventional parallel processors are designed as single monolithic dies having a converged architecture. In a converged architecture, the processing cores typically include specialized hardware for each target application domain in order to increases compute throughput when processing associated workloads.

One drawback of using a converged architecture for a parallel processor is that the memory bandwidth allocation for off-die DRAM is usually a compromise between the relatively low memory bandwidth demands of typical high performance computing workloads and the relatively high memory bandwidth demands of typical deep learning workloads. For many converged architecture parallel processors, addressing relatively high memory bandwidth demands could require removing other circuitry from the parallel processor or limiting other circuitry within the parallel processor. Removing or reducing circuitry usually, if not always, decreases overall processing performance, which is undesirable.

Configuring Parallel Processors for Different Application Domains

To address these issues, in some embodiments, the parallel processing subsystem 112 includes, without limitation, one or more composable parallel processors. As referred to herein, a "composable parallel processor" is a parallel processor that implements a composable on-package parallel processor architecture. In some embodiments, each composable parallel processor includes, without limitation, a parallel processor module (PPM), zero or more memory system modules (MSMs), and any amount (including none) and/or types of PP memory that are aggregated within a single package. In some embodiments, each MSM deepens the cache hierarchy of an associated PPM, provides one or more interfaces to PP memory, or both. In the same or other embodiments, each PPM is reused in conjunction with various combinations of MSMs and PP memories to generate multiple composable parallel processors that are optimized for different application domains and/or workloads.

In some embodiments, to generate a composable parallel processor, the PPM is selected from any number of available PPMs based on a type of parallel processor, a high-level architecture associated with the type of parallel processor, a package architecture, or any combination thereof. Some examples of types of parallel processors include, without limitation, a GPU, an intelligence processing unit, a neural processing unit, a tensor processing unit, a neural network processor, a data processing unit, a vision processing unit, or any other type of unit capable of executing large numbers of threads in parallel across multiple processing cores. For explanatory purposes, a PPM that is associated with a GPU is also referred to herein as a "GPU module" (GPM). A composable parallel processor that includes, without limitation, a GPM is also referred to herein as a "composable GPU." Some examples of package architectures are 2.5D and three dimensional 3D.

In some embodiments, to specialize the selected PPM, zero or more MSMs are selected from any number of available MSMs that are compatible with the selected PPM. The MSMs can be selected to augment a baseline memory system provided by the selected PPM based on expected memory system demands (e.g., typical memory system demands associated with the application domain), one or more types of on-chip PP memory, one or more types of memory interfaces, or any combination thereof. As referred to herein, a memory interface enables a composable parallel processor to access any amount and/or types of PP memory (e.g., DRAM). In the same or other embodiments, a memory interface includes, without limitation, any number of memory controllers, any number of physical interfaces (PHYs), and any number of I/O pads.

Referring back now to FIG. 1, in some embodiments, the parallel processing subsystem 112 includes, without limitation, one or more composable parallel processors. Each of the composable parallel processors included in the parallel processing subsystem 112 can be a GPU, an intelligence processing unit, a neural processing unit, a tensor processing unit, a neural network processor, a data processing unit, a vision processing unit, or any other type of unit capable of executing large numbers of threads in parallel across multiple processing cores.

In some embodiments, each of one or more composable parallel processors included in the parallel processing subsystem 112 can be connected in any technically feasible fashion to any amount (including none) and/or type of PP memory that is dedicated to the composable parallel processor. In the same or other embodiments, any number of composable parallel processors are integrated into a single package with any amount (including none) and/or types of PP memory. In some embodiments, the parallel processing subsystem 112 is a single chip that is also a composable parallel processor.

For explanatory purposes, some embodiments in which one or more composable parallel processors are generated based on a GPM and MSMs derived from a single exemplary GPU are described in detail below in conjunction with FIGS. 2-6C. Note that the techniques described herein are illustrative rather than restrictive and may be altered without departing from the broader spirit and scope of the invention. In particular, any number and/or types of composable parallel processors can be assembled from any number of PPM and any number of MSMs that are generated in any technically feasible fashion.

For instance, in some embodiments, any number of PPM and any number of MSMs can be derived from any number and/or types of parallel processors having any number and/or types of architectures. Further, each composable parallel processor can be integrated with any amount (including none) and/or types of PP memory via any number and/or types of interfaces in any technically feasible fashion. In some embodiments, any type of composable parallel processor can be aggregated within a single chip with any amounts and/or types of PP memory to generate a composable parallel processor that is memory-enable. A composable parallel processor that is memory-enabled is also referred to herein as "a memory-enabled composable parallel processor."

For explanatory purposes, the designation of HPC is used herein in conjunction with MSMs and composable parallel processors (e.g., composable GPUs) that are specialized for the relatively low memory bandwidth demands that are associated with many HPC workloads and many HPC applications. And the designation of DL is used herein in conjunction with MSMs and composable parallel processors that are specialized for the relatively high memory bandwidth demands that are associated with many DL workloads and many DL applications.

However, as persons skilled in the art will recognize, some HPC workloads and some HPC applications have relatively high memory bandwidth demands and can therefore be more efficiently executed by DL-designated composable parallel processors than by HPC-designated composable parallel processors. Conversely, some DL workloads and some DL applications have relatively low memory bandwidth demands and can therefore be more efficiently executed by HPC-designated composable parallel processors than by DL-designated composable parallel processors.

Accordingly, the designation HPC as used herein corresponds to an exemplary low memory bandwidth category that is associated with many but not all HPC workloads and many other workloads across a wide variety of application domains. The designation DL as used herein corresponds to an exemplary high memory bandwidth category that is associated with many but not all DL workloads and many other workloads across a wide variety of application domains. Note that the exemplary memory bandwidth categories described herein are illustrative rather than restrictive and the disclosed techniques can be applied to any number of different memory bandwidth categories corresponding to different ranges and/or types of memory bandwidth demands.

Figure 2:
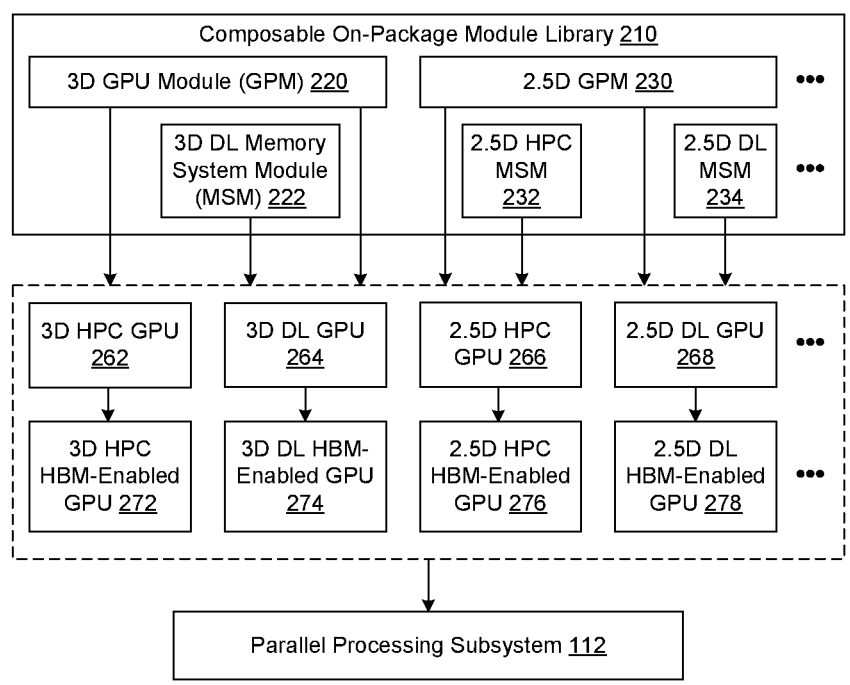
FIG. 2 illustrates a composable on-package module library that is implemented to generate composable parallel processors, according to various embodiments.

FIG. 2 illustrates a composable on-package module library 210 that is implemented to generate composable parallel processors, according to various embodiments. The composable on-package module library 210 includes, without limitation, any number of PPMs and any number of MSMs. Each PPM and each MSM is designed to be implemented on a single die. For explanatory purposes, an instance of a PPM implemented on a single die is also referred to herein as a "PPM" and a "PPM die." An instance of an MSM implemented on a single die is also referred to herein as an "MSM" and an "MSM die."

In some embodiments, each PPM is associated with a package architecture. Based on the associated package architecture, a PPM die can be integrated with zero or more compatible MSM dies using on-package aggregation to generate a composable parallel processor. In some embodiments, the resulting composable parallel processor includes, without limitation, no memory interfaces, one or more on-package memory interfaces, or one or more off-package memory interfaces. Based on the associated package architecture and the number and types of memory interfaces, a composable parallel processor can be assembled with zero or more PP dies into a single package. As used herein, a "PP die" refers to a die that includes, without limitation, any amount and/or type of PP memory.

The composable on-package module library 210 can be generated in any technically feasible fashion. In some embodiments, to generate the composable on-package module library 210, the architecture of each of any number and/or types of monolithic parallel processors is disaggregated into a baseline PPM and a baseline MSM. Each monolithic parallel processor can be disaggregated in any technically feasible fashion that facilitates optional augmentation of the memory system of the baseline PPM.

In some embodiments, for each of any number of package architectures, the baseline PPM is modified to generate a PPM that can be integrated with one or more MSMs using any type of on-package aggregation that is consistent with the package architecture. In the same or other embodiments, for each PPM, the associated baseline MSM is modified to generate at least one MSM that can be integrated with the PPM. In some embodiments, any amount and/or types of functionality can be added to a given PPM, any amount and/or types of functionality can be removed from a given PPM, any amount and/or types of functionality can be transferred from a given PPM to any number of associated MSMs, or any combination thereof based on any amount and/or types of criteria.

In some embodiments, any amount and/or types of functionality can be added to or removed from the PPM to fine-tune the PPM based on the least demanding target application domain (e.g., HPC). As described in greater detail below in conjunction with FIG. 3A, in some embodiments, to enable a PPM to be deployed as a composable parallel processor that does not include an MSM, any number and/or types of disableable memory interfaces can be added to the PPM. In some embodiments, and as described in greater detail below in conjunction with FIG. 3B, because a PPM is to be integrated with at least one MSM prior to deployment as a composable parallel processor, no memory interfaces are included in the PPM.

For each PPM, any number of MSMs can be generated based on the PPM, other associated MSMs, the associated baseline MSM, or any combination thereof to support any number and/or types of memory system demands. In some embodiments, for each PPM, at least one MSM is generated for each target application domain In the same or other embodiments, each MSM specializes the memory system of the associated PPM in any technically feasible fashion.

As shown, in some embodiments, the composable on-package module library 210 includes, without limitation, a 3D GPM 220, a 2.5D GPM 230, any number (including none) and/or types of other PPMs (indicated via ellipses), a 3D DL MSM 222, a 2.5D HPC MSM 232, a 2.5D DL MSM 234, and any number (including none) and/or types of other MSMs (indicated via ellipses). The 3D GPM 220, the 2.5D GPM 230, the 3D DL MSM 222, the 2.5D HPC MSM 232, the 2.5D DL MSM 234 are derived from a single monolithic GPU.

In some embodiments, to generate the 3D GPM 220, the 2.5D GPM 230, the 3D DL MSM 222, the 2.5D HPC MSM 232, the 2.5D DL MSM 234, the associated monolithic GPU is disaggregated into a baseline GPM and an associated baseline MSM based on the memory hierarchy. More specifically, the portion of the memory hierarchy below the level 2 (L2) cache is delegated to the baseline MSM and the remainder of the monolithic GPU is delegated to the baseline GPM. Advantageously, when the memory hierarchy is split in this fashion, existing L2 cache bandwidth filtering within the baseline GPM can significantly reduce off-GPM inter-die bandwidth demand.

In some embodiments, based on a 3D package architecture, the baseline GPM is modified to generate the 3D GPM 220. The 3D GPM 220 is deployable as a composable GPU that does not include an MSM and can be optionally integrated with a single instance of one of any number of associated MSMs. The baseline MSM is modified to generate the 3D DL MSM 222 and and any number (including zero) of other MSMs that can be integrated with the 3D GPM 220. As described in greater detail below, the 3D DL MSM 222 augments the memory system of the 3D GPM 220 for DL.

In the same or other embodiments, based on a 2.5D package architecture, the baseline GPM is modified to generate the 2.5D GPM 230. Prior to deployment as a composable GPU, the 2.5D GPM 230 is to be integrated with one or two instances of one of any number of associated MSMs, or one instance of each of two associated MSM. The baseline MSM is modified to generate the 2.5D HPC MSM 232, a 2.5D DL MSM 234, and any number (including zero) of other MSMs that can be integrated with the 2.5D GPM 230. As described in greater detail below, in some embodiments, the 2.5D HPC MSM 232 enables the 2.5D GPM 230 to interface with PP memory. Relative to the 2.5D HPC MSM 232, the 2.5D DL MSM 234 further augments the memory system of the 2.5D GPM 230 for DL.

As depicted via arrows, different instances of the 3D GPM 220 can be specialized to generate any number of composable GPUs for each of any number and/or types of application domains. In some embodiments, and as described in greater detail below in conjunction with FIGS. 3A and 4A, the 3D GPM 220 can be deployed without an MSM or vertically stacked with a single compatible MSM via 3D on-package integration. In some embodiments, the 3D GPM 220 is pre-equipped with a streamlined memory system that is optimized for HPC and enables the 3D GPM 220 to interface with one or more HBM stacks via any number of HBM interfaces that can be collectively disabled or enabled. In some embodiments, each HBM stack includes, without limitation, multiple DRAM dies that are vertically integrated or stacked using through-silicon vias (TSVs). Each HBM interface can be any type of memory interface that enables the 3D GPM 220 to access at least a portion of the DRAM included in at least one HBM stack in any technically feasible fashion.

The HBM interfaces included in the 3D GPM 220 can be disabled or enabled in any technically feasible fashion. In some embodiments, any number and/or types of memory switches included in the 3D GPM 220 can be configured to route memory access requests for data that is not resident within one or more cache memories included in the 3D GPM 220 to memory controllers included in the HBM interfaces or to an on-package MSM, thereby enabling or disabling, respectively, the HBM interfaces.

To specialize the 3D GPM 220 as a GPU for HPC, the HBM interfaces in the 3D GPM 220 are enabled. The resulting specialized 3D GPM is a GPU that is also referred to herein as a 3D HPC GPU 262. As described in greater detail below in conjunction with FIGS. 3B and 3C, in some embodiments, the 3D HPC GPU 262 can be aggregated with one or more HBM stacks within a single package using 2.5D on-silicon interposer integration to generate a 3D HPC HBM-enabled GPU 272. As used herein, an "HBM-enabled GPU" refers to a GPU that is aggregated with one or more HBM stacks in a single package In the same or other embodiments, each of any number of MSMs that are compatible with the 3D GPM 220 deepens the cache hierarchy of the 3D GPM 220, enables the 3D GPM 220 to interface with any amount (including none) and/or types of PP memory, or both. As described in greater detail below in conjunction with FIG. 4A, the 3D DL MSM 222 deepens the cache hierarchy of the 3D GPM 220 and enables the 3D GPM 220 to interface with multiple HBM stacks.

To specialize the 3D GPM 220 as a GPU for DL, the HBM interfaces in the 3D GPM 220 are disabled and the 3D GPM 220 is integrated with the 3D DL MSM 222 via 3D on-package integration. The resulting composable GPU is also referred to herein as a 3D DL GPU 264. As described in greater detail below in conjunction with FIGS. 4B and 4C, in some embodiments, the 3D DL GPU 264 can be aggregated with one or more HBM stacks within a single package using 2.5D on-silicon interposer integration to generate a 3D DL HBM-enabled GPU 274.

As depicted via arrows, different instances of the 2.5D GPM 230 can be specialized to generate any number of composable GPUs for each of any number and/or types of application domains. In some embodiments, and as described in greater detail below in conjunction with FIGS. 5A and 6A, the 2.5D GPM 230 can be integrated with one or two instances of a compatible MSM or an instance of each of two compatible MSMs using a planar die stacking approach via 2.5D on-package integration.

In some embodiments, because the 2.5D GPM 230 is to be integrated with at least one MSM prior to deployment as a composable GPU, the 2.5D GPM 230 does not include any memory interfaces. In the same or other embodiments, each of any number of MSMs that are compatible with the 2.5D GPM 230 enables the 2.5D GPM 230 to interface with any amount and/or types of PP memory and optionally deepens the cache hierarchy of the 2.5D GPM 230.

As described in greater detail below in conjunction with FIG. 5A, in some embodiments, the 2.5D HPC MSM 232 includes, without limitation, one or more HBM interfaces that enable the 2.5D GPM 230 to interface with one or more HBM stacks. To specialize the 2.5D GPM 230 as a GPU for HPC, the 2.5D GPM 230 is aggregated with one or two instances of the 2.5D DL MSM 232 via 2.5D on-package integration. The resulting composable GPU is also referred to herein as a 2.5D HPC GPU 266. As described in greater detail below in conjunction with FIGS. 5B and 5C, in some embodiments, the 2.5D HPC GPU 266 can be aggregated with one or more HBM stacks within a single package using 2.5D on-silicon interposer integration to generate a 2.5D HPC HBM-enabled GPU 276.

As described in greater detail below in conjunction with FIG. 6A, the 2.5D DL MSM 234 enables the 2.5D GPM 230 to interface with additional HBM stacks relative to the 2.5D HPC MSM 232 and deepens the cache hierarchy of the 2.5D GPM 230. To specialize the 2.5D GPM 230 as a GPU for DL, in some embodiments, the 2.5D GPM 230 is aggregated with one or two instances of the 2.5D DL MSM 234 via 2.5D on-package integration. The resulting composable GPU is also referred to herein as a 2.5D DL GPU 268. As described in greater detail below in conjunction with FIGS. 5B and 5C, in some embodiments, the 2.5D DL GPU 268 can be aggregated with one or more HBM stacks within a single package using 2.5D on-silicon interposer integration to generate a 2.5D DL HBM-enabled GPU 278.

As depicted via dotted lines, in some embodiments, one or more instances of the 3D HPC GPU 262, the 3D HPC HBM-enabled GPU 272, the 3D DL GPU 264, the 3D DL HBM-enabled GPU 274, the 2.5D HPC GPU 266, the 2.5D HPC HBM-enabled GPU 276, the 2.5D DL GPU 268, the 2.5D DL HBM-enabled GPU 278, any number of other GPUs (depicted via ellipse), or any combination thereof can be included in the parallel processing subsystem 112 of FIG. 1.

Notably, composable GPUs that include the 3D GPM 220 can be attached to at most one MSM. By contrast, composable GPUs that include the 2.5D GPU 230 can be attached to one or two MSMs. Each of the MSMs can be implemented on any die that is less than or equal to the maximum die size. Accordingly, relative to composable GPUs that include the 3D GPM 220, composable GPUs that include the 2.5D GPM 230 can include up to twice the amount of additional cache. Furthermore, because MSMs are connected to the 2.5D GPMs 230 in a planar fashion, MSMs can increase the total available die-edge of composable GPUs. The additional die-edge can be used to implement additional memory bandwidth and/or additional PP memory (e.g., HBM stacks).

Implementing a 3D GPU Module Across Different Application Domains

Figure 3A:
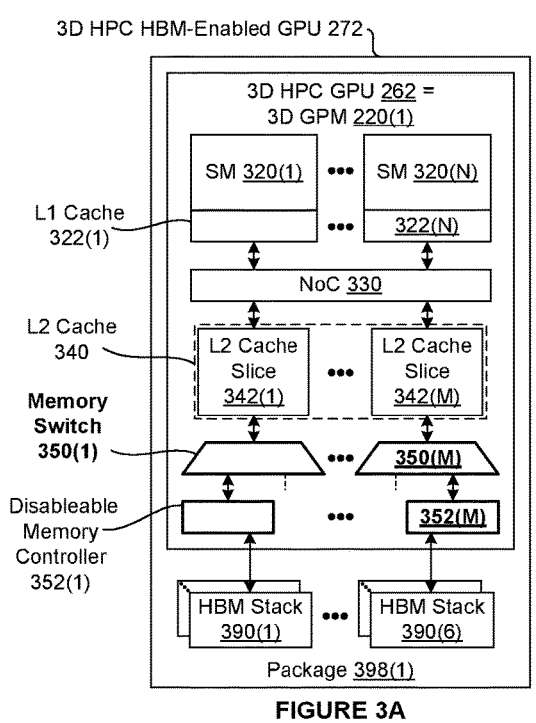
FIG. 3A is a block diagram of the three dimensional (3D) high performance computing (HPC) high bandwidth memory-enabled (HBM-enabled) graphics processing unit (GPU) of FIG. 2, according to various embodiments.

FIG. 3A is a block diagram of the 3D HPC HBM-enabled GPU 272 of FIG. 2, according to various embodiments. As shown, in some embodiments, the 3D HPC HBM-enabled GPU 272 includes, without limitation, the 3D HPC GPU 262, and HBM stacks 390(1)-390(6). In some embodiments, any positive number of HBM stacks can be included in the 3D HPC HBM-enabled GPU 272. As also shown, the 3D HPC HBM-enabled GPU 272 is included in a package 398(1). Notably, the 3D HPC GPU 262 is also a 3D GPM 220(1). The 3D GPM 220(1) is an instance of the 3D GPM 220 that is deployed as the 3D HPC HBM-enabled GPU 272 without an attached MSM.

As shown, in some embodiments, the 3D GPM 220(1) includes, without limitation, SMs 320(1)-320(N), level 1 (L1) caches 322(1)-322(N), a network on a chip (NoC) 330, an L2 cache 340, memory switches 350(1)-350(M), and disableable memory controllers 352(1)-352(M), where N and M can be any positive integers. As described previously herein in conjunction with FIG. 1, in some embodiments, each of the SMs 320(1)-320(N) is a multi-threaded processor core that includes, without limitation, multiple processor cores. In some embodiments, each of the SMs 320(1)-320(N) includes, without limitation, any number and/or types of specialized cores for each of any number of target application domains that increase compute throughput when processing associated workloads. For instance, in some embodiments, each of the SMs 320(1)-320(N) includes, without limitation, any number of ray tracing cores and/or any number of tensor cores that increase compute throughput for various high performance computing visual computing workloads and a wide variety of deep learning workloads, respectively.

As shown, the SMs 320(1)-320(N) are associated with the L1 caches 322(1)-322(N), respectively. In some embodiments, the L1 caches 322(1)-322(N) are included in the SMs 320(1)-320(N). In some other embodiments, the L1 caches 322(1)-322(N) are external to the SMs 320(1)-320(N), respectively. As shown, in some embodiments, the L1 caches 322(1)-322(N) are connected to the L2 cache 340 via the NoC 330. In some embodiments any number of L1 caches can be connected any number of L2 caches in any technically feasible fashion.

In some embodiments, the L2 cache 340 is a distributed L2 cache that includes, without limitation, L2 cache slices 342(1)-342(M). In the same or other embodiments, the L2 cache 340 serves as the point of coherence for the SMs 320(1)-320(N), meaning that the SMs 320(1)-320(N) access the same copy of a memory location via the L2 cache 340. In some embodiments, the L1 caches 322(1)-322(N) and the L2 cache 340 are collectively referred to as the "cache memories" associated with the 3D GPM 220(1) and are resident in the die that implements the 3D GPM 220.

As shown, in some embodiments, the L2 cache slices 342(1)-342(M) are connected to the memory switches 350(1)-350(M), respectively. The memory switches 350(1)-350(M) are configured to route memory access requests associated with L2 cache misses to the disableable memory controllers 352(1)-352(M), respectively, instead of to a 3D UHB link interface. The 3D UHB link interface is not used in the 3D GPM 220(1). As described in detail below in conjunction with FIG. 4A, the memory switches 350(1)-350(M) enable the 3D GPM 220 to be configured with or without an attached MSM, and the 3D UHB link interface enables the 3D GPM 220 to be connected to an MSM.

The disableable memory controllers 352(1)-352(M) can be any type of on-die memory controllers with respect to the 3D GPM 220. In the context of the disableable memory controllers 352(1)-352(M), as used herein, "disableable" indicates that the disableable memory controllers 352(1)-352(M) are unused when an instance of the 3D GPM 220 is attached to an MSM. In some embodiments, the number of L2 cache slices can differ from the number of memory switches, the number of memory switches can differ from the number of disableable memory controllers, the number of L2 cache slices can differ from the number of disableable memory controllers, or any combination thereof.

Although not explicitly shown, in some embodiments, the disableable memory controllers 352(1)-352(M) are included in HBM memory interfaces. In the same or other embodiments, each of the HBM memory interfaces includes, without limitation, one or more of the disableable memory controllers 352(1)-352(M), any number of PHYs, and any of HBM I/O pads. In some embodiments, the HBM I/O pads are connected to the HBM stacks 390(1)-390(6) via 2.5D on-silicon interposer integration (e.g., via TSVs). In some embodiments, connecting the HBM I/O pads to the HBM stacks 390(1)-390(6) enables each of the disableable memory controllers 352(1)-352(M) to access at least a portion of at least one of the HBM stacks 390(1)-390(6). In some embodiments, the 3D GPM 220(1) implements, without limitation, any amount and/or types of connectivity to deliver power between the die that implements the 3D GPM 220(1) and an interposer (not shown in FIG. 3A).

In some embodiments, any instance of the 3D GPM 220, including the 3D GPM 220(1), can include, without limitation, any number and/or types of caches, any number of levels of cache hierarchy, and any amount and/or types of memory logic. The memory logic can determine whether data associated with any type of memory access request is resident within the caches included in the 3D GPM 220 in any technically feasible fashion.

In the same or other embodiments, the 3D GPM 220 can include any number and/or types of switching mechanisms that can be configured to route memory access requests that are not satisfied by the caches within the 3D GPM 220 to a memory interface included in the 3D GPM 220 or to an MSM that is connected to the 3D GPM 220 via 3D on-package integration in any technically feasible fashion.

The caches and/or the memory logic included in the 3D GPM 220 can implement any amount and/or types of cache-related operations and/or optimization techniques in any technically feasible fashion. For instance, in some embodiments, the 3D GPM 220 can implement any number and/or types of cache filtering techniques, cache compression techniques, any other cache optimization techniques, or any combination thereof.

Figure 3B:
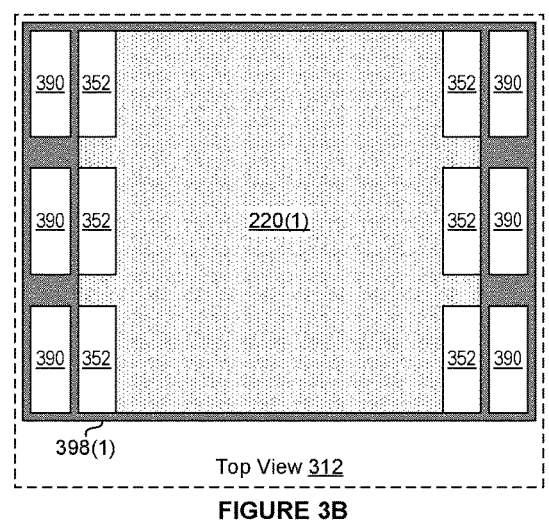
FIG. 3B illustrates a top view of the 3D HPC HBM-enabled GPU of FIG. 3A, according to various embodiments.

FIG. 3B illustrates a top view 312 of the 3D HPC HBM-enabled GPU 272 of FIG. 3A, according to various embodiments. As shown, the 3D HPC HBM-enabled GPU 272 is included in the package 398(1). The 3D GPM 220(1) is implemented in a single die and each of the HBM stacks 390 is implemented via multiple, vertically stacked dies. In some embodiments, the 3D GPM 220(1) is implemented in a single die having a size that is at or near the maximum possible size. In some embodiments, the disableable memory controllers 352 are positioned along two edges of the 3D GPM 220(1) and the HBM stacks 390 are positioned along the same two edges in relatively close proximity to the disableable memory controllers 352.

Figure 3C:
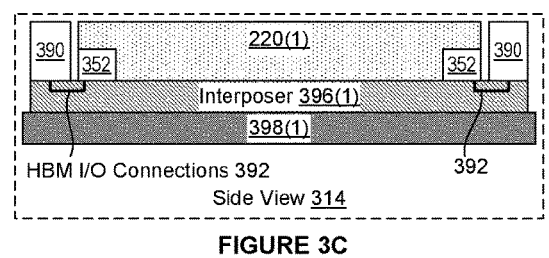
FIG. 3C illustrates a side view of the 3D HPC HBM-enabled GPU of FIG. 3A, according to various embodiments.

FIG. 3C illustrates a side view 314 of the 3D HPC HBM-enabled GPU 272 of FIG. 3A, according to various embodiments. As shown, in some embodiments, the 3D GPM 220(1) is stacked vertically on top of an interposer 396(1), and the interposer 396(1) is stacked vertically on top of the package 398(1). In the same or other embodiments, the interposer 396(1) overlaps the 3D GPM 220(1) on each side, and the package 398(1) overlaps the interposer 396(1) on each side. The disableable memory controllers 352 are positioned at or near the bottom of the 3D GPM 220(1) and are connected to the HBM stacks 390 through the interposer 396(1) via HBM I/Os (not shown) and HBM I/O connections 392.

Figure 4A:
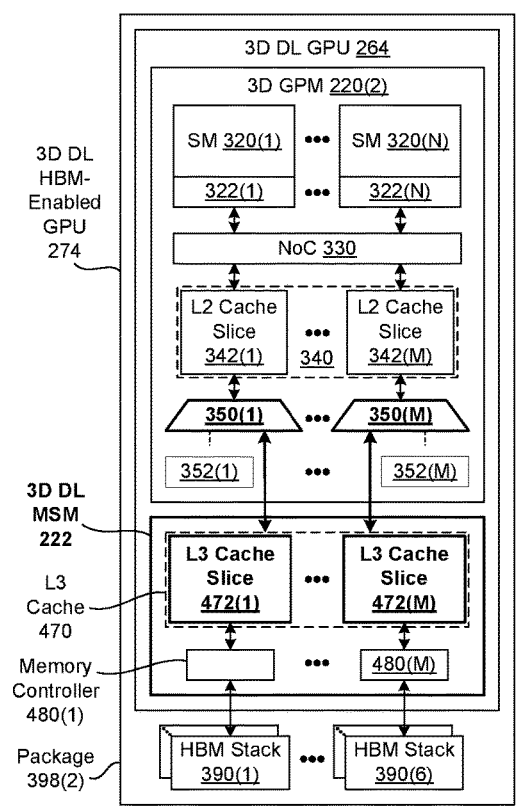
FIG. 4A is a block diagram of the 3D deep learning (DL) HBM-enabled GPU of FIG. 2, according to various embodiments.

FIG. 4A is a block diagram of the 3D DL HBM-enabled GPU 274 of FIG. 2, according to various embodiments. As shown, in some embodiments, the 3D DL HBM-enabled GPU 274 includes, without limitation, the 3D DL GPU 264, and HBM stacks 390(1)-390(6). In some embodiments, any positive number of HBM stacks can be included in the 3D DL HBM-enabled GPU 274. As also shown, the 3D DL HBM-enabled GPU 274 is included in a package 398(2).

As shown, in some embodiments, the 3D DL GPU 264 includes, without limitation, a 3D GPM 220(2) and a 3D DL MSM 222. The 3D GPM 220(2) is an instance of the 3D GPM 220 that is integrated with the 3D DL MSM 222 prior to deployment as the 3D DL GPU 264. In some embodiments, the components included in the 3D GPM 220(2) are the same as the components included in the 3D GPM 220(1) described previously herein in conjunction with FIG. 2. More specifically, in some embodiments, the 3D GPM 220(2) includes, without limitation, the SMs 320(1)-320(N), the L1 caches 322(1)-322(N), the NoC 330, the L2 cache 340, the memory switches 350(1)-350(M), and the disableable memory controllers 352(1)-352(M), where N and M can be any positive integers.

In contrast to the 3D GPM 220(1), the memory switches 350(1)-350(M) included in the 3D GPM 220(2) are configured to route memory access requests associated with L2 cache misses to a 3D UHB link interface (not explicitly shown) instead of the disableable memory controllers 352(1)-352(M), respectively. Accordingly, the disableable memory controllers 352(1)-352(M) included in the 3D GPM 220(2) are unused and effectively disabled. Although not shown, in some embodiments, the disableable memory controllers 352(1)-352(M) are included in HBM memory interfaces that are unused in the 3D GPM 220(2).

As described previously herein in conjunction with FIG. 3A, in some embodiments, the SMs 320(1)-320(N) are associated with the L1 caches 322(1)-322(N), respectively. In some embodiments, the L1 caches 322(1)-322(N) are included in the SMs 320(1)-320(N). In some other embodiments, the L1 caches 322(1)-322(N) are external to the SMs 320(1)-320(N), respectively. As shown, in some embodiments, the L1 caches 322(1)-322(N) are connected to the L2 cache 340 via the NoC 330. In some embodiments any number of L1 caches can be connected any number of L2 caches in any technically feasible fashion. In the same or other embodiments, the number of the number of L2 cache slices can differ from the number of memory switches, the number of memory switches can differ from the number of disableable memory controllers, the number of L2 cache slices can differ from the number of disableable memory controllers, or any combination thereof.

The 3D UHB link interface enables the 3D GPM 220(2) to be vertically integrated with a single compatible MSM via 3D on-package integration. The 3D UHB link interface can be implemented in any technically feasible fashion. In some embodiments, the 3D UHB link interface includes, without limitation, any number (including none) and/or types of components, any amount (including none) of area reserved on any number of silicon layers, any number of pads (e.g., a copper bond pad), or any combination thereof. In some embodiments, the 3D GPM 220(2) implements, without limitation, any amount and/or types of connectivity to deliver power between the die that implements the 3D GPM 220(2) and an interposer (not shown in FIG. 4A).

As depicted with bi-directional arrows between the 3D GPM 220(2) and the 3D DL MSM 222, the 3D DL MSM 222 is connected to the 3D GPM 220(2) via 3D on-package integration. More precisely, the 3D DL MSM 222 is vertically attached to the 3D DL MSM 222 via a 3D ultra-high bandwidth (UHB) link using high-density, intra-die bonding. In some embodiments, the 3D DL MSM 222 is positioned between the interposer and the 3D GPM 220(2). In the same or other embodiments, the 3D DL MSM 222 implements, without limitation, any amount and/or types of connectivity between the 3D GPM 220(2) and the interposer via any number of TSVs.

As shown, the 3D DL MSM 222 includes, without limitation, a level 3 (L3) cache 470 and memory controllers 480(1)-480(M). The 3D DL MSM 222 receives memory access requests that are associated with L2 cache misses from the 3D GPM 220(2) via the 3D UHB link. The 3D DL MSM 222 includes, without limitation, any amount and/or types of memory logic that enable the 3D DL MSM 222 to service the memory access requests in a hierarchical fashion via the L3 cache 470 and the HBM stacks 390(1)-390(6). In operation, if the data associated with a memory request received via the 3D UHB link is resident with the L3 cache 470, then the 3D DL MSM 222 satisfies the memory request using the L3 cache 470. Otherwise, the 3D DL MSM 222 configures the memory controllers 480(1)-480(M) to satisfy the memory request using the HBM stacks 390(1)-390(6). The 3D DL MSM 222 relays any data fetched from the L3 cache 470 and the HBM stacks 390(1)-390(6) to the 3D GPM 220(2) via the 3D UHB link.

The L3 cache 470 deepens the cache-hierarchy of the 3D GPM 220(2) and is also referred to as a last level cache (LLC) of the 3D DL GPU 264. The L3 cache 470 can be architecturally implemented in any technically feasible fashion. In some embodiments, the L3 cache 470 is architecturally implemented as yet another level of memory-side cache that backs the L2 cache 340. In the same or other embodiments, the L3 cache 470 is neither inclusive nor exclusive. In some embodiments, the L2 cache 340 serves as the point of coherence for the SMs 320(1)-320(N) and therefore the L3 cache 470 does not require coherence with the L2 cache 340. In some embodiments, cache lines (not shown) present in the L2 cache 340 supersede cache lines (not shown) present in the L3 cache 470 from the perspective of the 3D DL GPU 264. In the same or other embodiments, when a cache line is evicted from the L2 cache 340 in the 3D DL GPU 264, the 3D DL GPU 264 writes the cache line back to the L3 cache 470. In some embodiments, the 3D GPM 220(2) does not route any memory access request to the L3 cache 470 until the memory access request has been serviced via the L2 cache 340.

In some embodiments, the L3 cache 470 includes, without limitation, L3 cache slices 472(1)-472(M). As shown, in some embodiments, the L3 cache slices 472(1)-472(M) are connected to the L2 cache slices 342(1)-342(M), respectively, via the 3D UHB link and the memory switches 350(1)-350(M), respectively. In some embodiments, the L3 cache slices 472(1)-472(M) are connected to the memory controllers 480(1)-480(M), respectively.

The memory controllers 480(1)-480(M) receive memory access requests associated with L3 cache misses and, in response, interact with the HBM stacks 390(1)-390(6) in any technically feasible fashion to satisfy the memory access requests. Although not explicit shown, in some embodiments, the memory controllers 480(1)-480(M) are included in HBM memory interfaces. In the same or other embodiments, each of the HBM memory interfaces includes, without limitation, one or more of the memory controllers 480(1)-480(M), any number of PHYs, and any of HBM I/O pads.

In some embodiments, the HBM I/O pads of the 3D DL MSM 222 are connected to the HBM stacks 390(1)-390(6) via 2.5D on-silicon interposer integration (e.g., via TSVs). In some embodiments, connecting the HBM I/O pads of the 3D DL MSM 222 to the HBM stacks 390(1)-390(6) enables each of the memory controllers 480(1)-480(M) to access at least a portion of at least one of the HBM stacks 390(1)-390(6).

In some embodiments, the number of L3 cache slices can differ from the number of memory switches, the number of L2 cache slices, or both the number of memory switches and the number of L2 cache slices. In the same or other embodiments, the number of L3 cache slices can differ from the number of memory controllers.

In some embodiments, any instance of the 3D GPM 220, including the 3D GPM 220(2), can include, without limitation, any number and/or types of caches, any number of levels of cache hierarchy, and any amount and/or types of memory logic. The memory logic can determine whether data associated with any type of memory access request is resident within the caches included in the 3D GPM 220 in any technically feasible fashion.

In the same or other embodiments, the 3D GPM 220 can include, without limitation, any number and/or types of switching mechanisms that can be configured to route memory access requests that are not satisfied by the caches within the 3D GPM 220 to a memory interface included in the 3D GPM 220 or to an MSM that is connected to the 3D GPM 220 via 3D on-package integration in any technically feasible fashion.

In some embodiments, the 3D DL MSM 222 can include, without limitation, any number and/or types of caches, any number of levels of cache hierarchy, and any amount and/or types of memory logic. The level(s) of caches included in the 3D DL MSM 222 deepen the cache hierarchy and therefore the memory hierarchy of the 3D DL GPU 264 that is partially implemented in the 3D GPM 220. The memory logic can determine whether data associated with any type of memory access request is resident within the caches included in the 3D DL MSM 222 in any technically feasible fashion.

The caches and/or the memory logic included in the 3D GPM 220 and the 3D DL MSM 222 can implement any amount and/or types of cache-related operations and/or optimization techniques in any technically feasible fashion. For instance, in some embodiments, the 3D GPM 220 can implement any number and/or types of cache filtering techniques, cache compression techniques, any other cache optimization techniques, or any combination thereof.

Figure 4B:
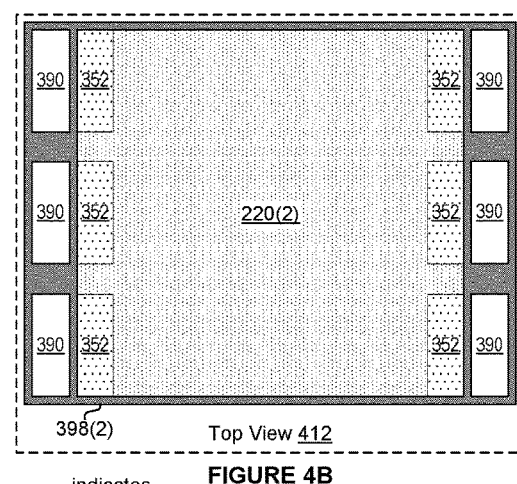
FIG. 4B illustrates a top view of the 3D DL HBM-enabled GPU of FIG. 4A, according to various embodiments.

FIG. 4B illustrates a top view 412 of the 3D DL HBM-enabled GPU 274 of FIG. 4A, according to various embodiments. As shown, the 3D DL HBM-enabled GPU 274 is included in the package 398(2). The 3D GPM 220(2) is implemented in a single die and each of the HBM stacks 390 is implemented via multiple, vertically stacked dies. Although not visible in the top view 412, the 3D DL MSM 222 is implemented in a single die that is vertically beneath the 3D GPM 220(2). In some embodiments, the 3D GPM 220(2) is implemented in a single die having a size that is at or near the maximum possible size. In the same or other embodiments, the 3D GPM 220(2) is implemented in a single die having a size that is at or near the maximum possible size. In some embodiments, the disableable memory controllers 352 are disabled and positioned along two edges of the 3D GPM 220(2). The HBM stacks 390 are positioned along the same two edges in relatively close proximity to the disableable memory controllers 352.

Figure 4C:
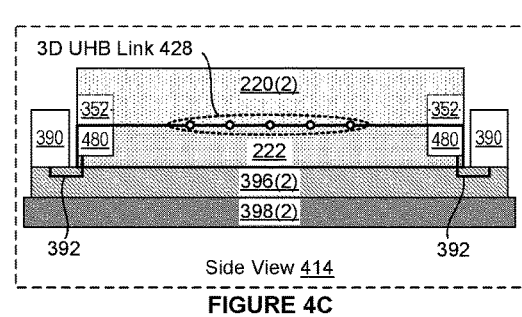
FIG. 4C illustrates a side view of the 3D DL HBM-enabled GPU of FIG. 4A, according to various embodiments.

FIG. 4C illustrates a side view 414 of the 3D DL HBM-enabled GPU 274 of FIG. 4A, according to various embodiments. As shown, in some embodiments, the 3D GPM 220(2) is stacked vertically on top of the 3D DL MSM 222, the 3D DL MSM 222 is stacked vertically on top of an interposer 396(2), and the interposer 396(2) is stacked vertically on top of the package 398(2). In some embodiments, the size of the 3D GPM 220(2) is the same as the size of the 3D DL MSM 222. In the same or other embodiments, the interposer 396(2) overlaps the 3D DL MSM 222 on each side, and the package 398(2) overlaps the interposer 396(2) on each side. The disableable memory controllers 352 are positioned at or near the bottom of the 3D GPM 220(2), and the memory controllers 480 are positioned beneath the disableable memory controllers 352 at or near the top of the 3D DL MSM 222.

As shown, in some embodiments, the memory controllers 480 are connected to the HBM stacks 390 through the interposer 396(2) via HBM I/Os included in the 3D DL MSM 222 and HBM I/O connections 392. In the same or other embodiments, the 3D GPM 220(2) is connected to the 3D DL MSM 222 via a 3D UHB link 428. Notably, the 3D UHB link 428 is significantly shorter and faster than each of the HBM I/O connections 392

Implementing a 2.5D GPU Module Across Different Application Domains

Figure 5A:
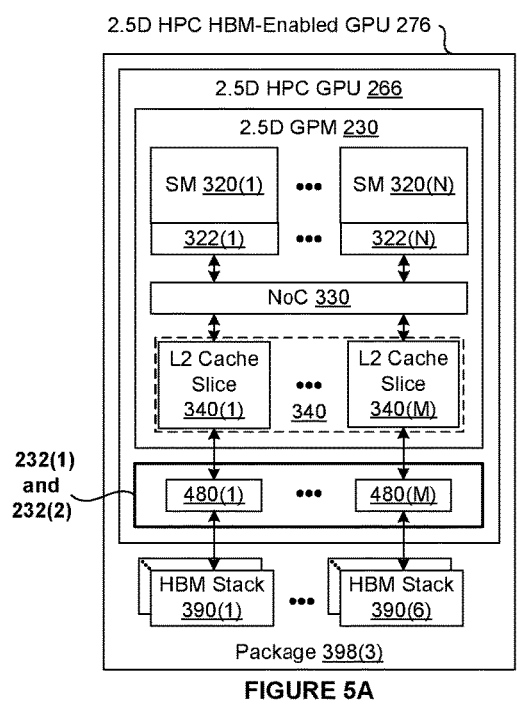
FIG. 5A is a block diagram of the two and a half dimensional (2.5D) HPC HBM-enabled GPU of FIG. 2, according to various embodiments.

FIG. 5A is a block diagram of the 2.5D HPC HBM-enabled GPU 276 of FIG. 2, according to various embodiments. As shown, in some embodiments, the 2.5D HPC HBM-enabled GPU 276 includes, without limitation, the 2.5D HPC GPU 266 and HBM stacks 390(1)-390(6), and is implemented in a package 398(3). In some embodiments, any positive number of HBM stacks can be included in the 2.5D HPC HBM-enabled GPU 276.

As shown, in some embodiments, the 2.5D HPC GPU 266 includes, without limitation, the 2.5D GPM 230, a 2.5D HPC MSM 232(1), and a 2.5D HPC MSM 232(2). The 2.5D HPC MSM 232(1) and the 2.5D HPC MSM 232(2) are two instances of the 2.5D HPC MSM 232. In some embodiments, the 2.5D GPM 230 includes, without limitation, the SMs 320(1)-320(N), the L1 caches 322(1)-322(N), the NoC 330, and the L2 cache 340. In some embodiments, the SMs 320(1)-320(N), the L1 caches 322(1)-322(N), the NoC 330, and the L2 cache 340 included in the 2.5D GPM 230 are the same as the components included in the 3D GPM 220(1) described previously herein in conjunction with FIG. 2.

In some embodiments, the L1 caches 322(1)-322(N) are included in the SMs 320(1)-320(N). In some other embodiments, the L1 caches 322(1)-322(N) are external to the SMs 320(1)-320(N), respectively. As shown, in some embodiments, the L1 caches 322(1)-322(N) are connected to the L2 cache 340 via the NoC 330. In some embodiments any number of L1 caches can be connected any number of L2 caches in any technically feasible fashion.

In some embodiments, the 2.5D GPM 230 can include, without limitation, any number and/or types of caches, any number of levels of cache hierarchy, and any amount and/or types of memory logic. The caches and/or the memory logic included in the 2.5D GPM 230 can implement any number and/or types of cache-related operations and/or optimization techniques in any technically feasible fashion. For instance, in some embodiments, the 2.5D GPM 230 can implement any number and/or types of cache filtering techniques, cache compression techniques, any other cache optimization techniques, or any combination thereof.

Advantageously, in some embodiments, the 2.5D GPM 230 does not include any memory interfaces and can use the "freed" area to implement additional compute resources. Instead of implementing memory interfaces, if the 2.5D GPM 230 determines that data associated with a memory access request is not resident within the caches included in the 2.5D GPM 230, then the 2.5D GPM 230 transmits the memory access request to one of two 2.5D USB link interfaces (not shown in FIG. 5A). The 2.5D GPM 230 can determine that data associated with a memory access request is not resident within the caches included in the 2.5D GPM 230 and route the memory access request to one of the 2.5D USB link interfaces in any technically feasible fashion.

The 2.5D USB link interfaces enable the 2.5D GPM 230 to be integrated with one or two instances of a single compatible MSM, or one instance of each of two compatible MSMs in a planar fashion via 2.5D on-package integration. The 2.5D USB link interfaces can be implemented in any technically feasible fashion. In some embodiments, each 2.5D USB link interface includes, without limitation, any number (including none) and/or types of components, any amount (including none) of area reserved on any number of silicon layers, any number of pads (e.g., a copper bond pad), or any combination thereof. In some embodiments, the two 2.5D USB link interfaces included in the 2.5D GPM 230 can be the same as one another or can differ from each other.

As depicted with bi-directional arrows, the 2.5D GPM 230 is connected to both the 2.5D HPC MSM 232(1) and the 2.5D HPC MSM 232(2) in a planar fashion via 2.5D on-package integration. More precisely, in some embodiments, one of the 2.5D USB link interfaces included in the 2.5D GPM 230 is attached to a 2.5D USB link interface included in the 2.5D HPC MSM 232(1) via one 2.5D UHB link. The other 2.5D USB link interface included in the 2.5D GPM 230 is attached to a 2.5D USB link interface included in the 2.5D HPC MSM 232(2) via another 2.5D UHB link. In some embodiments, the 2.5D HPC MSM 232(1) and the 2.5D HPC MSM 232(2) are positioned on opposite sides of the 2.5D GPM 230.

In some embodiments, each of the 2.5D USB link interfaces included in the 2.5D GPM 230 can be the same or can differ from the 2.5D USB link included in each instance of the 2.5D HPC MSM 232. In the same or other embodiments, one of the 2.5D USB link interfaces included in the 2.5D GPM 230 is connected to a 2.5D USB link interface included in the 2.5D HPC MSM 232(1) via a single 2.5D UHB link, and the other 2.5D link interface included in the 2.5D GPM 230 is unused.

The 2.5D HPC MSM 232(1) and the 2.5D HPC MSM 232(2) receive memory access requests that the 2.5D GPM 230 is unable to satisfy via the cache hierarchy implemented in the 2.5D GPM 230 via the 2.5D UHB links. As shown, collectively, the 2.5D HPC MSM 232(1) and the 2.5D HPC MSM 232(2) include, without limitation, the memory controllers 480(1)-480(M). In operation, the memory controllers 480(1)-480(M) receive and satisfy memory access requests received via the 2.5D UHB links using the HBM stacks 390(1)-390(6). The memory controllers 480(1)-480(M) can interact with the HBM stacks 390(1)-390(6) in any technically feasible fashion to satisfy the memory access requests.

Although not explicitly shown, in some embodiments, the memory controllers 480(1)-480(M) are included in HBM memory interfaces. In the same or other embodiments, each of the HBM memory interfaces includes, without limitation, one or more of the memory controllers 480(1)-480(M), any number of PHYs, and any of HBM I/O pads. The 2.5D HPC MSM 232(1) and the 2.5D HPC MSM 232(2) relay any data fetched from the HBM stacks 390(1)-390(6) to the 2.5D GPM 230 via the 2.5D UHB links.

In some embodiments, the HBM I/O pads of the 2.5D HPC MSM 232(1) and the 2.5D HPC MSM 232(2) are connected to the HBM stacks 390(1)-390(6) via 2.5D on-silicon interposer integration (e.g., via TSVs). In some embodiments, connecting the HBM I/O pads of the 2.5D HPC MSM 232(1) and the 2.5D HPC MSM 232(2) to the HBM stacks 390(1)-390(6) enables each of the memory controllers 480(1)-480(M) to access at least a portion of at least one of the HBM stacks 390(1)-390(6).

Memory access requests, the memory controllers 480(1)-480(M) and the integration to the HBM stacks 390(1)-390(6) can be distributed between the 2.5D HPC MSM 232(1) and the 2.5D HPC MSM 232(2) in any technically feasible fashion. In some embodiments, the 2.5D HPC MSM 232(1) includes, without limitation, the memory controllers 480(1)-480(M/2), and the HBM I/O pads of the 2.5D HPC MSM 232(1) are connected to the HBM stacks 390(1)-390(3) via 2.5D on-silicon interposer integration. In the same or other embodiments, the 2.5D HPC MSM 232(2) includes, without limitation, the memory controllers 480(M/2+1)-480(M), and the HBM I/O pads of the 2.5D HPC MSM 232(2) are connected to the HBM stacks 390(4)-390(6) via 2.5D on-silicon interposer integration. In some embodiments, connecting the HBM I/O pads of the 2.5D HPC MSM 232(2) to the HBM stacks 390(4)-390(6) enables each of the memory controllers 480(M/2+1)-480(M) to access at least a portion of at least one of the HBM stacks 390(1)-390(3).

In some embodiments, the 2.5D GPM 230 forwards memory requests associated with L2 cache misses corresponding to L2 cache slices 342(1)-342(M/2) to the 2.5D HPC MSM 232(1) via a 2.5D UHB link 528(1). The 2.5D HPC MSM 232(1) configures the memory controllers 480(1)-480(M/2) to satisfy the memory request using one or more of the HBM stacks 390(1)-390(3). The memory controllers 480(1)-480(M/2) can interact with the HBM stacks 390(1)-390(3) in any technically feasible fashion to satisfy memory access requests. The HPC MSM 232(1) relays any data fetched from the HBM stacks 390(1)-390(3) to the 2.5D GPM 230 via the 2.5D UHB link 528(1).

In the same or other embodiments, the 2.5D GPM 230 forwards memory requests associated with L2 cache misses corresponding to L2 cache slices 342(M/2+1)-342(M) to the 2.5D HPC MSM 232(2) via the 2.5D UHB link 528(2). The 2.5D HPC MSM 232(2) configures the memory controllers 480(M/2+1)-480(M) to satisfy the memory request using one or more of the HBM stacks 390(4)-390(6). The memory controllers 480(M/2+1)-480(M) can interact with the HBM stacks 390(4)-390(6) in any technically feasible fashion to satisfy memory access requests. The HPC MSM 232(2) relays any data fetched from the HBM stacks 390(4)-390(6) to the 2.5D GPM 230 via the 2.5D UHB link 528(2).

Figure 5B:
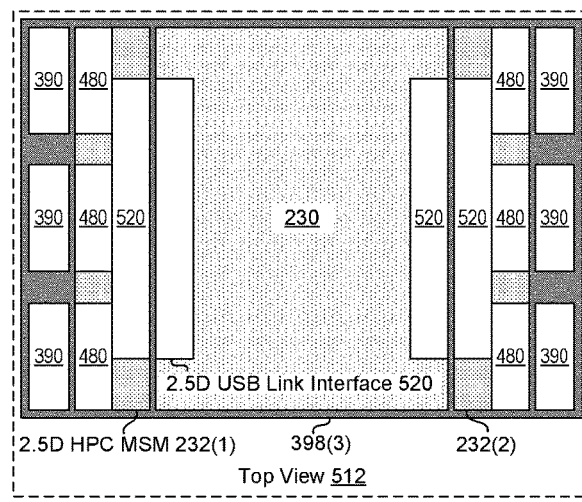
FIG. 5B illustrates a top view of the 2.5D HPC HBM-enabled GPU of FIG. 5A, according to various embodiments.

FIG. 5B illustrates a top view 512 of the 2.5D HPC HBM-enabled GPU 276 of FIG. 5A, according to various embodiments. As shown, the 2.5D HPC HBM-enabled GPU 276 is included in the package 398(3). The 2.5D GPM 230 is implemented in one die that can be at or near the maximum possible size. The 2.5D HPC MSM 232(1) is implemented in another die on one side of the 2.5D GPM 230, and the 2.5D HPC MSM 232(2) is implemented in yet another die on another side of the 2.5D GPM 230.

As shown, in some embodiments, the 2.5D GPM 230, the 2.5D HPC MSM 232(1), and the 2.5D HPC MSM 232(2) implement two, one, and one 2.5D USB link interfaces 520, respectively. In some embodiments, relative to the 2.5D GPM 230, three of the memory controllers 480 are positioned at or near the opposite edge of the 2.5D HPC MSM 232(1). Relative to the 2.5D GPM 230, three of the memory controllers 480 are positioned at or near the opposite edge of the 2.5D HPC MSM 232(2) The HBM stacks 390 are distributed near the outer boundary of the package 398(3), in relatively close proximity to the memory controllers 480.

Figure 5C:
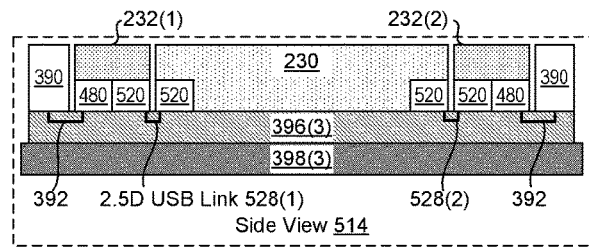
FIG. 5C illustrates a side view of the 2.5D HPC HBM-enabled GPU of FIG. 5A, according to various embodiments.

FIG. 5C illustrates a side view 514 of the 2.5D HPC HBM-enabled GPU 276 of FIG. 5A, according to various embodiments. As shown, in some embodiments, a portion of the HBM stacks 390, the 2.5D HPC MSM 232(1), the 2.5D GPM 230, the 2.5D HPC MSM 232(2), and the remainder of the HBM stacks 390 are arranged sequentially in a planar fashion on top of an interposer 396(3). The interposer 396(3) is stacked on top of the package 398(3). In some embodiments, the package 398(3) overlaps the interposer 396(3) on each side.

As shown, in some embodiments, the memory controllers 480 are distributed at or near the outer edges of 2.5D HPC MSM 232(1) and 2.5D HPC MSM 232(2) and are connected to the HBM stacks 390 through the interposer 396(3) via HBM I/O connections 392. The 2.5D UHB link interface 520 included in the 2.5D HPC MSM 232(1) is connected to one of the 2.5D UHB link interfaces 520 included in the 2.5D GPM 230 via a 2.5D UHB link 528(1). The 2.5D UHB link interface 520 included in the 2.5D HPC MSM 232(2) is connected a different one of the 2.5D UHB link interfaces 520 included in the 2.5D GPM 230 via a 2.5D UHB link 528(2). Notably, each of the 2.5D UHB link 528(1) and 528(2) is significantly shorter and faster than each of the HBM I/O connections 392.

Figure 6A:
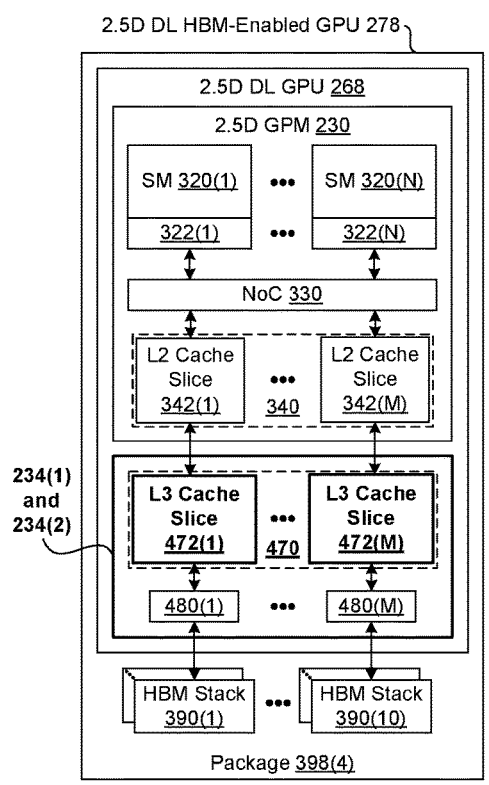
FIG. 6A is a block diagram of the 2.5D DL HBM-enabled GPU of FIG. 2, according to various embodiments.

FIG. 6A is a block diagram of the 2.5D DL HBM-enabled GPU 278 of FIG. 2, according to various embodiments. In some embodiments, relative to the 2.5D HPC HBM-enabled GPU 276, the 3D DL HBM-enabled GPU 274, and the 3D HPC HBM-enabled GPU 272, the available die-edge of the 2.5D DL HBM-enabled GPU 278 is larger and therefore the 2.5D DL HBM-enabled GPU 278 can accommodate HBM stacks 390(6)-390(10) in addition to the HBM stacks 390(1)-390(5). As shown, in some embodiments, the 2.5D DL HBM-enabled GPU 278 includes, without limitation, the 2.5D DL GPU 268 and HBM stacks 390(1)-390(10) integrated within a package 398(4). In some embodiments, any positive number of HBM stacks can be included in the 2.5D HPC HBM-enabled GPU 278, subject to die area limitations and package area limitations.

As shown, in some embodiments, the 2.5D DL GPU 268 includes, without limitation, the 2.5D GPM 230, a 2.5D DL MSM 234(1), and a 2.5D DL MSM 234(2). The 2.5D DL MSM 234(1) and the 2.5D DL MSM 234(2) are two instances of the 2.5D DL MSM 234. The 2.5D GPM 230 was described previously in detail previously herein in conjunction with FIG. 5A. However, the 2.5D GPM 230 included in the 2.5D HPC GPU 266 described previously herein in conjunction with FIG. 5A is connected to the 2.5D HPC MSM 232(1) and the 2.5D HPC MSM 232(2), while the 2.5D GPM 230 included in the 2.5D DL GPU 268 is connected to the 2.5D DL MSM 234(1) and the 2.5D DL MSM 234(2).

As depicted with bi-directional arrows, the 2.5D GPM 230 is connected to both the 2.5D DL MSM 234(1) and the 2.5D DL MSM 234(2) in a planar fashion via 2.5D on-package integration. As shown in detail below in conjunction with FIG. 5C, in some embodiments, one of the 2.5D USB link interfaces 520 included in the 2.5D GPM 230 is attached to the 2.5D USB link interface 520 included in the 2.5D DL MSM 234(1) via 2.5D UHB link 528(1). The remaining one of the 2.5D USB link interfaces 520 included in the 2.5D GPM 230 is attached to the 2.5D USB link interface 520 included in the 2.5D DL MSM 234(2) via 2.5D UHB link 528(2). In some embodiments, the 2.5D DL MSM 234(1) and the 2.5D DL MSM 234(2) are positioned on opposite sides of the 2.5D GPM 230.

In some embodiments, each of the 2.5D USB link interfaces 520 included in the 2.5D GPM 230 can be the same or can differ from the 2.5D USB link interface 520 included in each instance of the 2.5D DL MSM 234. In the same or other embodiments, one of the 2.5D 2.5D USB link interfaces 520 included in the 2.5D GPM 230 is connected the 2.5D USB link interface 520 included in the 2.5D DL MSM 234(1) via 2.5D UHB link 528(1), and the other one of the 2.5D USB link interfaces 520 included in the 2.5D GPM 230 is unused.

As shown, in some embodiments, the 2.5D DL MSM 234(1) and the 2.5D DL MSM 234(2) receive memory access requests that are associated with L2 cache misses from the 2.5D GPM 230 via the 2.5D UHB link 528(1) and the 2.5D UHB link 528(2), respectively. As shown, collectively, the 2.5D DL MSM 234(1) and the 2.5D DL MSM 234(2) include, without limitation, the L3 cache 470 and the memory controllers 480(1)-480(M). In some embodiments, 2.5D DL MSM 234 includes, without limitation, any amount and/or types of memory logic that enable the 2.5D DL MSM 234 to service memory access requests in a hierarchical fashion via the portion of the L3 cache 470 included in the 2.5D DL MSM 234 and any portion (including all) of the HBM stacks 390(1)-390(10) that are connected to the 2.5D DL MSM 234.

The L3 cache 470 deepens the cache-hierarchy of the 2.5D GPM 230 and is also referred to as an LLC of the 2.5D DL GPU 268. The L3 cache 470 can be architecturally implemented and distributed between the 2.5D DL MSM 234(1) and the 2.5D DL MSM 234(2) in any technically feasible fashion. In some embodiments, the L3 cache 470 is architecturally implemented as yet another level of memory-side cache that backs the L2 cache 340. In the same or other embodiments, the L3 cache 470 is neither inclusive nor exclusive. In some embodiments, the L2 cache 340 serves as the point of coherence for the SMs 320(1)-320(N) and therefore the L3 cache 470 does not require coherence with the L2 cache 340. In some embodiments, cache lines (not shown) present in the L2 cache 340 supersede cache lines (not shown) present in the L3 cache 470 from the perspective of the 2.5D DL GPU 268. In the same or other embodiments, when a cache line is evicted from the L2 cache 340 in the 2.5D DL GPU 268, the 2.5D DL GPU 268 writes the cache line back to the L3 cache 470. In some embodiments, the 2.5D GPM 230 does not route any memory access request to the L3 cache 470 until the memory access request has been serviced via the L2 cache 340.

In some embodiments, the L3 cache 470 includes, without limitation, L3 cache slices 472(1)-472(M). As shown, in some embodiments, the L3 cache slices 472(1)-472(M) are connected to the L2 cache slices 342(1)-342(M), respectively, via the 2.5D UHB link 528(1) and the 2.5D UHB link 528(2) and the memory switches 350(1)-350(M), respectively. In the same or other embodiments, the L3 cache slices 472(1)-472(M) are connected to the memory controllers 480(1)-480(M), respectively.

In some embodiments, the 2.5D DL MSM 234(1) includes, without limitation, the L3 cache slices 472(1)-472(M/2) and the memory controllers 480(1)-480(M/2). The 2.5D GPM 230 forwards memory requests associated with L2 cache misses corresponding to L2 cache slices 342(1)-342(M/2) to the 2.5D DL MSM 234(1) via the 2.5D UHB link 528(1). If the data associated with a memory request forwarded to the 2.5D DL MSM 234(1) via the 2.5D UHB link 528(1) is resident within the L3 cache slices 472(1)-472(M/2), then the 2.5D DL MSM 234(1) satisfies the memory request using the L3 cache slices 472(1)-472(M/2). Otherwise, the 2.5D DL MSM 234(1) configures the memory controllers 480(1)-480(M/2) to satisfy the memory request using one or more of the HBM stacks 390(1)-390(5). The memory controllers 480(1)-480(M/2) can interact with the HBM stacks 390(1)-390(5) in any technically feasible fashion to satisfy memory access requests. The 2.5D DL MSM 234(1) relays any data fetched from the L3 cache slices 472(1)-472(M/2) and the HBM stacks 390(1)-390(5) to the 2.5D GPM 230 via the 2.5D UHB link 528(1).

In some embodiments, the 2.5D DL MSM 234(2) includes, without limitation, the L3 cache slices 472(M/2+1)-472(M) and the memory controllers 480(M/2+1)-480(M). The 2.5D GPM 230 forwards memory requests associated with L2 cache misses corresponding to L2 cache slices 342(M/2+1)-342(M) to the 2.5D DL MSM 234(2) via the 2.5D UHB link 528(2). If the data associated with a memory request forwarded to the 2.5D DL MSM 234(2) via the 2.5D UHB link 528(2) is resident within the L3 cache slices 472(M/2+1)-472(M), then the 2.5D DL MSM 234(2) satisfies the memory request using the L3 cache slices 472(M/2+1)-472(M). Otherwise, the 2.5D DL MSM 234(2) configures the memory controllers 480(M/2+1)-480(M) to satisfy the memory request using one or more of the HBM stacks 390(6)-390(10). The memory controllers 480(M/2+1)-480(M) can interact with the HBM stacks 390(6)-390(10) in any technically feasible fashion to satisfy memory access requests. The 2.5D DL MSM 234(2) relays any data fetched from the L3 cache slices 472(M/2+1)-472(M) and the HBM stacks 390(6)-390(10) to the 2.5D GPM 230 via the 2.5D UHB link 528(2).

Although not explicitly shown, in some embodiments, the memory controllers 480(1)-480(M) are included in HBM memory interfaces. In the same or other embodiments, each of the HBM memory interfaces includes, without limitation, one or more of the memory controllers 480(1)-480(M), any number of PHYs, and any of HBM I/O pads.

In some embodiments, the HBM I/O pads of the 2.5D DL MSM 234(1) are connected to the HBM stacks 390(1)-390(5) via 2.5D on-silicon interposer integration (e.g., via TSVs). In some embodiments, connecting the HBM I/O pads of the 2.5D DL MSM 234(1) to the HBM stacks 390(1)-390(5) enables each of the memory controllers 480(1)-480(M/2) to access at least a portion of at least one of the HBM stacks 390(1)-390(5).

In some embodiments, the HBM I/O pads of the 2.5D DL MSM 234(2) are connected to the HBM stacks 390(6)-390(10) via 2.5D on-silicon interposer integration (e.g., via TSVs). In some embodiments, connecting the HBM I/O pads of the 2.5D DL MSM 234(2) to the HBM stacks 390(6)-390(10) enables each of the memory controllers 480(M/2+1)-480(M) to access at least a portion of at least one of the HBM stacks 390(6)-390(10).

In some embodiments, the number of L3 cache slices can differ from the number of memory switches, the number of L2 cache slices, or both the number of memory switches and the number of L2 cache slices. In the same or other embodiments, the number of L3 cache slices can differ from the number of memory controllers. In some embodiments, the number of HBM stacks 390 included in the 2.5D DL GPU 268 can be any positive integer.

In some embodiments, the 2.5D GPM 230 can include, without limitation, any number and/or types of caches, any number of levels of cache hierarchy, and any amount and/or types of memory logic. The memory logic can determine whether data associated with any type of memory access request is resident within the caches included in the 2.5D GPM 230 in any technically feasible fashion. When the 2.5D GPM 230 is attached to two MSMs, the memory logic can determine whether to forward a given memory access request via the 2.5D UHB links 528(1) or the 2.5D UHB links 528(2) in any technically feasible fashion.

In some embodiments, the 2.5D DL MSM 234 can include, without limitation, any number and/or types of caches, any number of levels of cache hierarchy, and any amount and/or types of memory logic. The level(s) of caches included in the 2.5D DL MSM 234 deepen the cache hierarchy and therefore the memory hierarchy of the 2.5D DL GPU 268 that is partially implemented in the 2.5D GPM. The memory logic can determine whether data associated with any type of memory access request is resident within the caches included in the 3D DL MSM 234 in any technically feasible fashion.

The caches and/or the memory logic included in the 2.5D GPM 230 and the 2.5D DL MSM 234 can implement any cache organization and any number and/or types of cache-related operations and/or optimization techniques in any technically feasible fashion. For instance, in some embodiments, the 2.5D GPM 230 can implement any number and/or types of cache filtering techniques, cache compression techniques, any other cache optimization techniques, or any combination thereof.

Figure 6B:
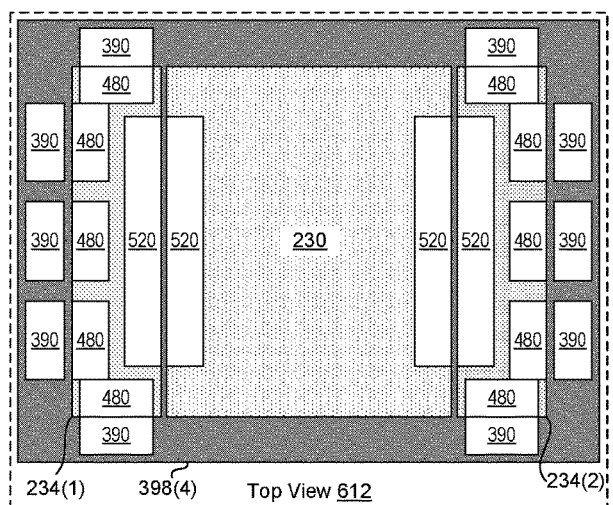
FIG. 6B illustrates a top view of the 2.5D DL HBM-enabled GPU of FIG. 6A, according to various embodiments.

FIG. 6B illustrates a top view 612 of the 2.5D DL HBM-enabled GPU 278 of FIG. 6A, according to various embodiments. As shown, the 2.5D DL HBM-enabled GPU 278 is included in the package 398(4). The 2.5D GPM 230 is implemented in one die that can be at or near the maximum possible size. The 2.5D DL MSM 234(1) is implemented in another die on one side of the 2.5D GPM 230, and the 2.5D DL MSM 234(2) is implemented in yet another die on another side of the 2.5D GPM 230. The dies associated with the 2.5D DL MSM 234(1) and the 2.5D DL MSM 234(2) can each be at or near the maximum possible size.

As shown, in some embodiments, the 2.5D GPM 230, the 2.5D DL MSM 234(1), and the 2.5D DL MSM 234(2) implement two, one, and one 2.5D USB link interfaces 520, respectively. In some embodiments, a portion of the memory controllers 480 are distributed in close proximity to the available edges of the 2.5D DL MSM 234(1). The remainder of the memory controllers 480 are distributed in close proximity to the available edges of the 2.5D DL MSM 234(2) The HBM stacks 390(1)-390(10) are distributed near the outer boundary of the package 398(4), in relatively close proximity to the memory controllers 480.

Figure 6C:
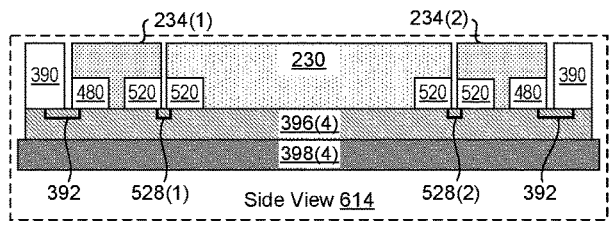
FIG. 6C illustrates a side view of the 2.5D DL HBM-enabled GPU of FIG. 6A, according to various embodiments.

FIG. 6C illustrates a side view 614 of the 2.5D DL HBM-enabled GPU 278 of FIG. 6A, according to various embodiments. As shown, in some embodiments, a portion of the HBM stacks 390, the 2.5D DL MSM 234(1), the 2.5D GPM 230, the 2.5D DL MSM 234(2), and the remainder of the HBM stacks 390 are arranged sequentially in a planar fashion on top of an interposer 396(4). The interposer 396(4) is stacked on top of the package 398(4). In some embodiments, the package 398(4) overlaps the interposer 396(4) on each side.

As shown, in some embodiments, the memory controllers 480 are distributed at or near the outer edges of 2.5D DL MSM 234(1) and 2.5D DL MSM 2342) and are connected to the HBM stacks 390 through the interposer 396(4) via HBM I/O connections 392. The 2.5D UHB link interface 520 included in the 2.5D DL MSM 234(1) is connected to one of the 2.5D UHB link interfaces 520 included in the 2.5D GPM 230 via 2.5D UHB link 528(1). The 2.5D UHB link interface 520 included in the 2.5D DL MSM 234(2) is connected a different one of the 2.5D UHB link interfaces 520 included in the 2.5D GPM 230 via 2.5D UHB link 528(2). Notably, each of the 2.5D UHB link 528(1) and the 2.5D UHB link 528(2) is significantly shorter and faster than each of the HBM I/O connections 392.

Figure 7:
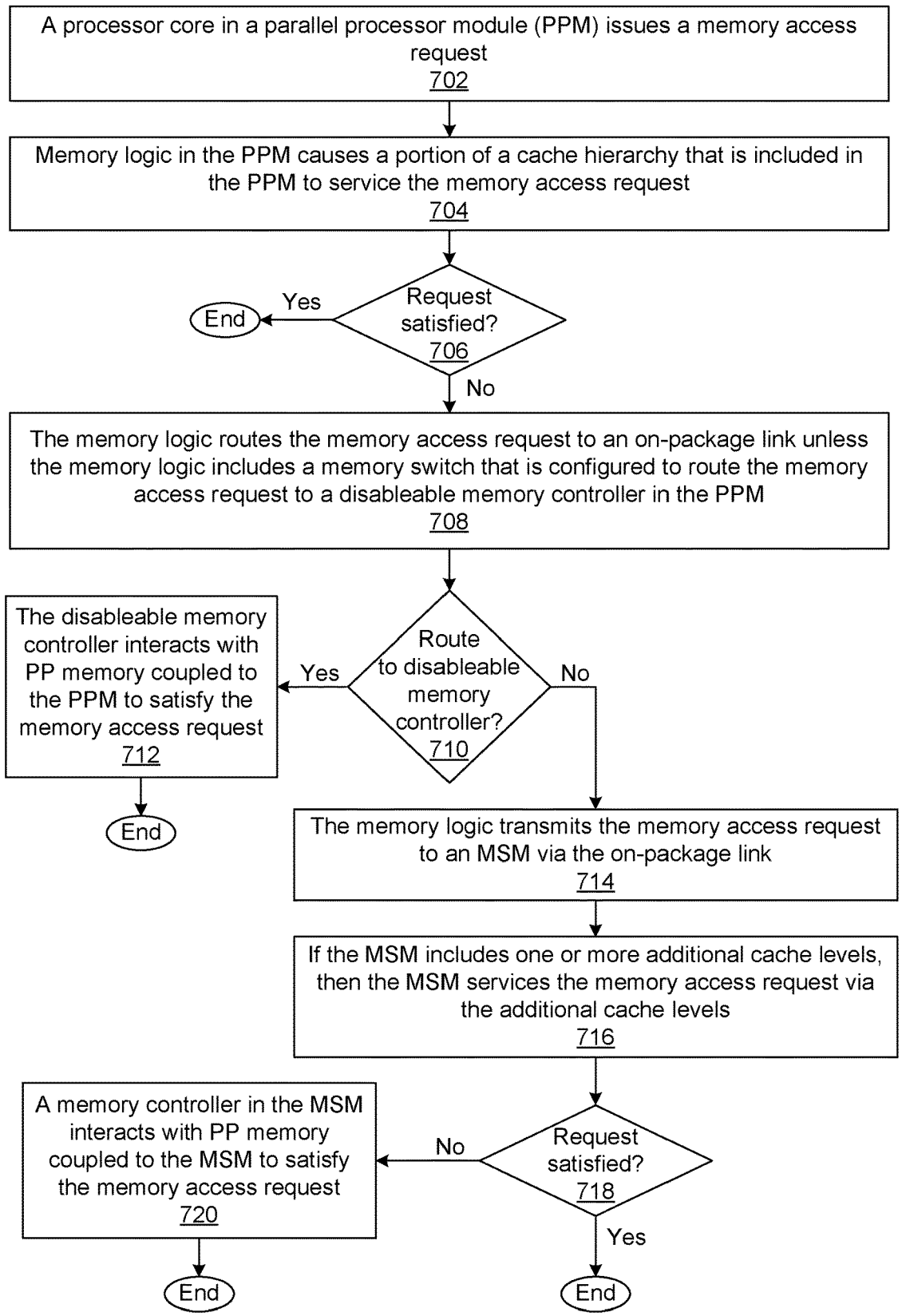
FIG. 7 is a flow diagram of method steps for servicing a memory access request associated with a processor core included in a composable parallel processor, according to various embodiments.

FIG. 7 is a flow diagram of method steps for servicing a memory access request associated with a processor core included in a composable parallel processor, according to various embodiments. Although the method steps are described in the context of the systems of FIGS. 1-6C, persons skilled in the art will understand that any system configured to implement the method steps, in any order, falls within the scope of the present invention.

As shown, a method 700 begins at step 702, where a processor core in a PPM issues a memory access request. At step 704, memory logic in the PPM causes a portion of a cache hierarchy that is included in the PPM to service the memory access request. At step 706, the memory logic in the PPM determines whether the memory access request is satisfied. At step 706, if the memory logic in the PPM determines that the memory access request is satisfied, then the method 700 terminates.

If, however, at step 706, if the memory logic in the PPM determines that the memory access request is not satisfied, then the method 700 proceeds to step 708. At step 708, the memory logic in the PPM routes the memory access request to an on-package link unless the memory logic in the PPM includes memory switch 350 that is configured to route the memory access request to disableable memory controller 352 included in the PPM. At step 710, if the memory logic in the PPM routes the memory access request to the disableable memory controller 352, then the method proceeds to step 712. At step 712, the disableable memory controller 352 interacts with PP memory coupled to the PPM to satisfy the memory access request. The method 700 then terminates.

If however, at step 710, the memory logic in the PPM does not route the memory access request to the disableable memory controller 352, then the method proceeds directly to step 714. At step 714, the memory logic transmits the memory access request to an MSM via the on-package link. At step 716, if the MSM includes one or more additional cache levels, then the MSM services the memory access request via the additional cache levels.

At step 718, if the memory access request is satisfied, then the method 700 terminates. If, however, at step 718, the memory access request is not satisfied, then the method 700 proceeds to step 720. At step 716, one of the memory controllers 480(1)-480(M) interacts with PP memory coupled to the MSM to satisfy the memory access request. The method 700 then terminates.

In sum, the disclosed techniques can be used customize the memory system of different instances of a reusable PPM to generate parallel processors that are specialized for different application domains. To generate a parallel processor, an instance of a PPM is implemented on a single die and is aggregated, within a single package, with zero or more other dies that each augment the memory system of the PPM. In some embodiments, each of the other dies implements, without limitation, an instance of one of any number of MSMs or any amount of PP memory (e.g., DRAM). In some embodiments, each MSM deepens the cache hierarchy of the PPM, modifies the number and/or types of memory interfaces, or any combination thereof.

In some embodiments, a 3D GPM is a PPM that includes, without limitation, multi-threaded processor cores having dedicated L1 caches, a distributed L2 cache, disableable memory controllers, HBM memory interfaces, memory switches, and one or more interfaces for one or more 3D UHB links. To specialize an instance of the 3D GPM for HPC, the memory switches are configured to route memory access requests associated with L2 cache misses to the disableable memory controllers. The HBM memory interfaces included in the resulting instance are attached to the HBM stacks using 2.5D on-silicon interposer integration to generate a 3D HPC HBM-enabled GPU. In operation, as the disableable memory controllers receive memory access requests via the memory switches, the disableable memory controllers interact, via the HBM memory interfaces, with the HBM stacks to satisfy the memory access requests.

To specialize an instance of the 3D GPM for DL, the instance of the 3D GPM is vertically attached to an instance of a 3D DL MSM via one or more 3D UHB links using high-density intra-die bonding. The 3D DL MSM provides connectivity between the 3D GPM and the silicon interposer via through silicon vias. The 3D DL MSM includes, without limitation, interfaces for the 3D UHB links, the L3 cache, memory controllers, and HBM memory interfaces. The memory switches included in the 3D GPM are configured to route memory access requests associated with L2 cache misses to the L3 cache via the 3D UHB links. The HBM memory interfaces included in the instance of the 3D DL MSM are attached to the HBM stacks via 2.5D on-silicon interposer integration to generate a 3D DL HBM-enabled GPU. In operation, the L3 cache services memory access requests received via the 3D UHB links. The 3D DL MSM forwards memory access requests associated with L3 cache misses to the memory controllers. As the memory controllers receive memory access requests, the memory controllers interact, via the HBM memory interfaces, with the HBM stacks to satisfy the memory access requests.

In some embodiments, a 2.5D GPM is a parallel processor module that includes, without limitation, multi-threaded processor cores having dedicated L1 caches, a distributed L2 cache, HBM memory interfaces, and one or more interfaces for one or more 2.5D UHB links. To specialize an instance of the 2.5D GPM for HPC, the instance of the 2.5D GPM is attached to one or two instances of a 2.5D HPC MSM via one or more 2.5D UHB links using high-density intra-die bonding. Each instance of the 2.5D HPC MSM includes, without limitation, memory controllers and HBM memory interfaces. The HBM memory interfaces included in the instance(s) of the 2.5D HPC MSM are attached to the HBM stacks via 2.5D on-silicon interposer integration to generate a 2.5D HPC HBM-enabled GPU. In operation, the 2.5D GPM routes memory access associated with L2 cache misses to the memory controllers included in the instance(s) of the 2.5D HPC MSM via the 2.5D UHB links. As the memory controllers receive memory access requests, the memory controllers interact, via the HBM memory interfaces, with the HBM stacks to satisfy the memory access requests.

To specialize an instance of the 2.5D GPM for DL, the instance of the 2.5D GPM is attached to two instances of an 2.5D GPM via two or more 2.5D UHB links using high-density intra-die bonding. Each instance of the 2.5D DL MSM includes, without limitation, half of an L3 cache, memory controllers and HBM memory interfaces. The HBM memory interfaces included in the 2.5D DL MSMs are attached to the HBM stacks via 2.5D on-silicon interposer integration to generate a 2.5D DL HBM-enabled GPU. Relative to the 2.5D GPM, the two 2.5D DL MSMs increase the total available die-edge and can therefore be attached to additional HBM stacks. In operation, the 2.5D GPM routes memory access associated with L2 cache misses to the memory controllers in the instances of the 2.5D DL MSM via the 2.5D UHB links. As the memory controllers receive memory access requests, the memory controllers interact, via the HBM memory interfaces, with the HBM stacks to satisfy the memory access requests.

At least one technical advantage of the disclosed techniques relative to the prior art is that, with the disclosed techniques, the performance of a parallel processor module implemented on a single die can be effectively tailored for different memory bandwidth demands that typify different application domains. In particular, for workloads having relatively high memory bandwidth demands, a parallel processor can be configured with a processor module that can access additional cache memory via one or more on-package, ultra-high bandwidth links, which can reduce the DRAM access delays and memory bandwidth bottlenecks normally experienced with converged architecture parallel processors. Further, because the additional cache memory is implemented on a separate die, there is no need to remove circuitry from the processor module or limit circuitry within the processor module to make room for the additional cache memory. These technical advantages provide one or more technological improvements over prior art approaches.

In some embodiments, a parallel processor comprises a parallel processor module implemented within a first die, wherein the parallel processor module includes a plurality of processor cores and a plurality of cache memories; and a memory system module implemented within a second die and coupled to the parallel processor module via an on-package link, wherein the memory system module includes a first memory controller for accessing a first dynamic random access memory (DRAM).

2. The parallel processor of clause 1, wherein the plurality of cache memories includes at least one level 1 cache and a level 2 cache.

3. The parallel processor of clauses 1 or 2, wherein the memory system module further includes a level 3 cache.

4. The parallel processor of any of clauses 1-3, wherein the plurality of cache memories comprises a first portion of a cache hierarchy, and the memory system module includes a second portion of the cache hierarchy.

5. The parallel processor of any of clauses 1-4, wherein the parallel processor module further includes a second memory controller and a switch that is configured to disable the second memory controller.

6. The parallel processor of any of clauses 1-5, wherein the first die and the second die are vertically stacked within a single package.

7. The parallel processor of any of clauses 1-6, wherein the first die and the second die are laterally stacked within a single package.

8. The parallel processor of any of clauses 1-7, wherein the on-package link comprises an on-package three dimensional ultra-high bandwidth link or an on-package two and a half dimensional ultra-high bandwidth link.

9. The parallel processor of any of clauses 1-8, wherein a third die that includes the first DRAM is coupled to the second die via two and a half dimensional on-silicon interposer integration.

10. The parallel processor of any of clauses 1-9, wherein the first DRAM is implemented in a third die that is included in a vertical stack of DRAM dies.

11. The parallel processor of any of clauses 1-10, wherein a first processor core included in the plurality of processor cores includes at least one of a tensor core or a ray tracing core.

12. The parallel processor of any of clauses 1-11, wherein a level 2 cache included in the plurality of cache memories comprises a point of coherence for the plurality of processor cores.

13. In some embodiments, a computer-implemented method for servicing memory access requests associated with a plurality of processor cores comprises determining that data corresponding to a first memory access request is not resident within a plurality of cache memories resident within a first die, wherein the first memory access request is associated with a first processor core that is implemented within the first die; and in response, transmitting the first memory access request to a memory system module via an on-package link, wherein the memory system module is implemented within a second die and includes a first memory controller.

14. The computer-implemented method of clause 13, wherein transmitting the first memory access request to the memory system module comprises transmitting the first memory access request to a switch included in the first die that routes memory access requests to the memory system module via the on-package link instead of routing memory access requests to an on-die memory controller.

15. The computer-implemented method of clauses 13 or 14, further comprising, in response to receiving the first memory access request, determining that data associated with the first memory access request is not resident within a last level cache that is included in the memory system module, and accessing the data associated with the first memory access request via the first memory controller.

16. The computer-implemented method of any of clauses 13-15, further comprising, in response to receiving the first memory access request, accessing data associated with the first memory access request via a last level cache included in the memory system module.

17. The computer-implemented method of any of clauses 13-16, further comprising evicting a first cache line from a level 2 cache included in the plurality of cache memories; and writing the first cache line to a level 3 cache included in the memory system module.

18. The computer-implemented method of any of clauses 13-17, wherein a level 2 cache included in the plurality of cache memories comprises a point of coherence for the plurality of processor cores.

19. The computer-implemented method of any of clauses 13-18, further comprising receiving data accessed via the first memory access request via the on-package link.

20. The computer-implemented method of any of clauses 13-19, wherein determining that data corresponding to the first memory access request is not resident within the plurality of cache memories comprises determining that data corresponding to the first memory access request is not resident in a first level cache that is included in the plurality of cache memories and is associated with the first processor core; and determining that data corresponding to the first memory access request is not resident in a second level cache that is included in the plurality of cache memories.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following an electrical connection having one or more wires, a portable computer diskette, a hard disk, a random access memory, a read-only memory, an erasable programmable read-only memory, Flash memory, an optical fiber, a portable compact disc read-only memory, an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general-purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A parallel processor comprising:
   a parallel processor module implemented within a first die, wherein the parallel processor module includes a plurality of processor cores, a plurality of cache memories, and a first memory controller that accesses a first dynamic random access memory (DRAM) for a first application and is disabled from accessing the first DRAM for a second application; and
   a memory system module implemented within a second die and coupled to the parallel processor module via an on-package link, wherein the memory system module includes a second memory controller that accesses the first DRAM.

2. The parallel processor of claim 1, wherein the plurality of cache memories includes at least one level 1 cache and a level 2 cache.

3. The parallel processor of claim 1, wherein the memory system module further includes a level 3 cache.

4. The parallel processor of claim 1, wherein the plurality of cache memories comprises a first portion of a cache hierarchy, and the memory system module includes a second portion of the cache hierarchy.

5. The parallel processor of claim 1, wherein the parallel processor module further includes a switch that is configured to disable the first memory controller.

6. The parallel processor of claim 1, wherein the first die and the second die are vertically stacked within a single package.

7. The parallel processor of claim 1, wherein the first die and the second die are laterally stacked within a single package.

8. The parallel processor of claim 1, wherein the on-package link comprises an on-package three dimensional ultra-high bandwidth link or an on-package two and a half dimensional ultra-high bandwidth link.

9. The parallel processor of claim 1, wherein a third die that includes the first DRAM is coupled to the second die via two and a half dimensional on-silicon interposer integration.

10. The parallel processor of claim 1, wherein the first DRAM is implemented in a third die that is included in a vertical stack of DRAM dies.

11. The parallel processor of claim 1, wherein a first processor core included in the plurality of processor cores includes at least one of a tensor core or a ray tracing core.

12. The parallel processor of claim 1, wherein a level 2 cache included in the plurality of cache memories comprises a point of coherence for the plurality of processor cores.

13. The parallel processor of claim 1, wherein the first application comprises a high performance computing (HPC) application associated with a first amount of memory bandwidth demands.

14. The parallel processor of claim 13, wherein the second application comprises a deep learning (DL) application associated with a second amount of memory bandwidth demands that is greater than the first amount.

15. A computer-implemented method for servicing memory access requests associated with a plurality of processor cores, the method comprising:
   determining that data corresponding to a first memory access request is not resident within a plurality of cache memories resident within a first die, wherein the first memory access request is associated with a first processor core that is implemented within the first die, and wherein the first die includes a first memory controller that accesses a first dynamic random access memory (DRAM) for a first application and is disabled from accessing the first DRAM for a second application; and
   in response, transmitting the first memory access request to a memory system module via an on-package link, wherein the memory system module is implemented within a second die and includes a second memory controller that accesses the first DRAM.

16. The computer-implemented method of claim 15, wherein transmitting the first memory access request to the memory system module comprises transmitting the first memory access request to a switch included in the first die that routes memory access requests to the memory system module via the on-package link instead of routing memory access requests to the first memory controller.

17. The computer-implemented method of claim 15, further comprising, in response to receiving the first memory access request, determining that data associated with the first memory access request is not resident within a last level cache that is included in the memory system module, and accessing the data associated with the first memory access request via the second memory controller.

18. The computer-implemented method of claim 15, further comprising, in response to receiving the first memory access request, accessing data associated with the first memory access request via a last level cache included in the memory system module.

19. The computer-implemented method of claim 15, further comprising evicting a first cache line from a level 2 cache included in the plurality of cache memories; and
   writing the first cache line to a level 3 cache included in the memory system module.

20. The computer-implemented method of claim 15, wherein a level 2 cache included in the plurality of cache memories comprises a point of coherence for the plurality of processor cores.

21. The computer-implemented method of claim 15, further comprising receiving data accessed via the first memory access request via the on-package link.

22. The computer-implemented method of claim 15, wherein determining that data corresponding to the first memory access request is not resident within the plurality of cache memories comprises:
   determining that data corresponding to the first memory access request is not resident in a first level cache that is included in the plurality of cache memories and is associated with the first processor core; and
   determining that data corresponding to the first memory access request is not resident in a second level cache that is included in the plurality of cache memories.

* * * * *